(12) United States Patent
Hano et al.

(10) Patent No.: US 12,031,048 B2
(45) Date of Patent: Jul. 9, 2024

(54) INK SET AND RECORDING METHOD

(71) Applicant: Seiko Epson Corporation, Tokyo (JP)

(72) Inventors: Yoshifumi Hano, Matsumoto (JP);
Kazuhiko Kitamura, Matsumoto (JP);
Masahiro Yatake, Shiojiri (JP)

(73) Assignee: SEIKO EPSON CORPORATION (JP)

( * ) Notice: Subject to any disclaimer, the term of this patent is extended or adjusted under 35 U.S.C. 154(b) by 105 days.

(21) Appl. No.: 17/456,403

(22) Filed: Nov. 24, 2021

(65) Prior Publication Data

US 2022/0169882 A1    Jun. 2, 2022

(30) Foreign Application Priority Data

Nov. 27, 2020 (JP) ................. 2020-197279

(51) Int. Cl.
*C09D 11/54* (2014.01)
*B41J 2/21* (2006.01)
(Continued)

(52) U.S. Cl.
CPC ............. *C09D 11/54* (2013.01); *B41J 2/2107* (2013.01); *B41M 5/0023* (2013.01);
(Continued)

(58) Field of Classification Search
CPC ... B41J 2/01; B41J 2/211; B41J 2/1433; B41J 2/17; B41J 2/17593; B41J 2/2107; B41J 2/1755; B41J 2/2114; B41J 2/2117; B41J 2/2056; B41J 2/21; B41J 2/0057; B41J 3/60; B41J 2002/012; B41J 2/04598; B41J 2/04588; B41J 2/04595; B41J 2/04586; B41J 2/14274; B41J 2/1623; B41J 2202/00; B41J 2202/03; B41J 2/14201; B41J 2/045; B41J 11/0015; B41J 11/002; B41J 2/04581; B41J 2/055; B41J 2/16538; B41J 2002/16502; B41J 29/02; B41J 2/17513; B41J 2/17509; B41J 29/13; B41J 2/17553; B41J 2/1606; B41J 2/1642; B41J 2/1609; B41J 2/164; B41J 2/162; B41J 2/161; B41J 2/19; B41J 15/04; B41J 25/001;
(Continued)

(56) References Cited

U.S. PATENT DOCUMENTS

2011/0242200 A1* 10/2011 Tojo .................. B41J 2/2107
347/21
2015/0367656 A1* 12/2015 Denda .................. B41J 2/01
347/21
(Continued)

FOREIGN PATENT DOCUMENTS

| JP | 2010-221670 A | 10/2010 |
| JP | 2018-123255 A | 8/2018 |
| JP | 2020-084013 A | 6/2020 |

*Primary Examiner* — Manish S Shah
(74) *Attorney, Agent, or Firm* — Harness, Dickey & Pierce, P.L.C.

(57) ABSTRACT

An ink set according to one embodiment of the disclosure includes a colored ink composition, which contains a pigment and is a water-based ink jet ink, and a water-based resin liquid composition which contains a resin, in which the resin liquid composition contains a urethane resin having an alicyclic structure or an aromatic ring structure and an acid value of 50 to 100 mg KOH/g.

16 Claims, 2 Drawing Sheets

(51) Int. Cl.
*B41M 5/00* (2006.01)
*C09D 11/102* (2014.01)
*C09D 11/322* (2014.01)
*C09D 11/40* (2014.01)

(52) U.S. Cl.
CPC ........ *C09D 11/102* (2013.01); *C09D 11/322* (2013.01); *C09D 11/40* (2013.01)

(58) Field of Classification Search
CPC ........ B41J 25/34; B41J 25/003; B41J 25/312; B41J 2025/008; B41J 2202/21; B41J 2/17596; B41J 2/16508; B41J 2/1652; B41J 2/175; B41J 2/17563; C09D 11/36; C09D 11/40; C09D 11/30; C09D 11/38; C09D 11/32; C09D 11/322; C09D 11/324; C09D 11/328; C09D 11/101; C09D 11/102; C09D 11/005; C09D 11/54; C09D 11/52; C09D 11/106; C09D 11/326; C09D 11/107; C09D 11/03; C09D 11/037; C09D 11/033; B41M 5/0011; B41M 5/0017; B41M 5/0023; B41M 5/0047; B41M 7/00; B41M 7/0072; B41M 5/52; B41M 5/5218; B41M 5/5227

See application file for complete search history.

(56) References Cited

U.S. PATENT DOCUMENTS

| | | | |
|---|---|---|---|
| 2016/0090497 A1* | 3/2016 | Ito | B41J 2/2107 347/100 |
| 2017/0165979 A1* | 6/2017 | Ohta | B41M 7/009 |
| 2018/0282567 A1* | 10/2018 | Ishida | C09D 11/54 |
| 2019/0352524 A1* | 11/2019 | Yatake | B41J 2/01 |
| 2021/0198503 A1* | 7/2021 | Yatake | B41M 5/0047 |
| 2021/0371687 A1* | 12/2021 | Ishida | B41J 2/2107 |
| 2023/0023979 A1* | 1/2023 | Asakawa | B41M 5/0011 |

* cited by examiner

INK SET AND RECORDING METHOD

The present application is based on, and claims priority from JP Application Serial Number 2020-197279, filed Nov. 27, 2020, the disclosure of which is hereby incorporated by reference herein in its entirety.

BACKGROUND

1. Technical Field

The present disclosure relates to an ink set and a recording method.

2. Related Art

In the ink jet recording method, small droplets of an ink are ejected from fine nozzles and are attached to a recording medium to perform recording. This method is able to record high-resolution, high-quality images at a high speed with a relatively inexpensive apparatus. In the ink jet recording method, a large number of elements including the properties of the ink composition to be used, stability in recording, and the quality of the obtained images are to be considered, and research on ink jet inks to be used, as well as on ink jet recording apparatuses, is also an active field.

In recent years, the application of ink jet inks to non-absorbent media (recording media) to which inks do not easily attach, for example, so-called flexible packaging films, has also been attempted. Such flexible packaging films are supplied as roll media, which are long media, and are rolled up and collected after printing. The printed flexible packaging film is then set as a base film and laminated with a sealant film to be used as a packaging material.

For example, JP-A-2018-123255 discloses an ink jet ink composition including a white or non-white pigment and a urethane resin with an acid value of 5 to 30 mg KOH/g, which is suitable for performing printing on a flexible packaging film.

However, there are cases where blocking occurs where the recording surface and the recording medium stick together or cases where the laminate peels off, in which there are problems in that the laminate peeling strength and blocking resistance of the recorded material are inferior.

SUMMARY

An ink set according to an aspect of the disclosure includes a colored ink composition which contains a pigment and is a water-based ink jet ink, and a water-based resin liquid composition which contains a resin, in which the resin liquid composition contains a urethane resin having an alicyclic structure or an aromatic ring structure and an acid value of 50 to 100 mg KOH/g.

A recording method according to another aspect of the disclosure includes a colored ink composition attaching step of attaching a colored ink composition to a recording medium by an ink jet method, and a resin liquid composition attaching step of attaching a resin liquid composition to the recording medium.

DESCRIPTION OF EXEMPLARY EMBODIMENTS

Figure 1:
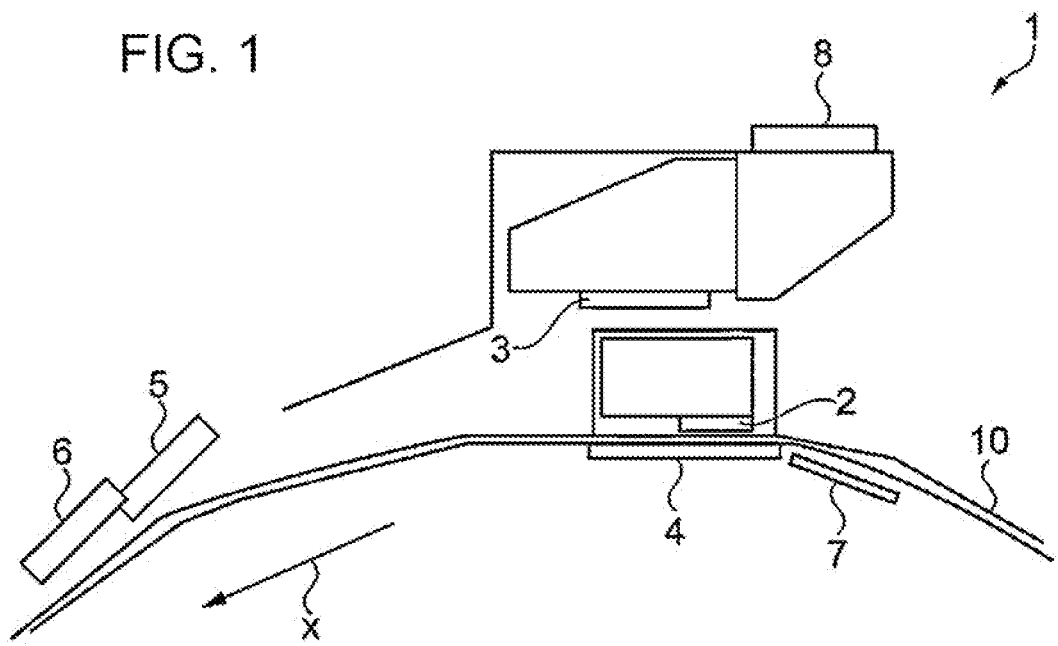
FIG. 1 is a schematic sectional view showing a configuration of an ink jet recording apparatus.

Embodiments of the disclosure will be described below. The embodiments described below explain examples of the disclosure. The disclosure is in no way limited to the following embodiments and also includes various modifications carried out in a range in which the gist of the disclosure is not changed. Note that not all of the configurations described below are necessarily indispensable components of the disclosure.

1. INK SET

An ink set according to one embodiment of the disclosure includes a colored ink composition, which contains a pigment and is a water-based ink jet ink, and a water-based resin liquid composition which contains a resin. The resin liquid composition contains a urethane resin having an alicyclic structure or an aromatic ring structure and having an acid value of 50 to 100 mg KOH/g.

When recording is performed on a recording medium using a colored ink composition containing a pigment, there is a problem in that the laminate peeling strength and blocking resistance of the recorded material are inferior. It is considered that this problem occurs because pigments generally do not have adhesive properties. In particular, for a recorded material using a white ink containing a white pigment as the colored ink composition, the laminate peeling strength, blocking resistance, and abrasion resistance tend to be inferior, and among the above, the laminate peeling strength tends to be particularly inferior. In white inks, one cause of the above is the high pigment content and the large average particle diameter of the pigments. In addition, non-white inks containing non-white pigments tend to be inferior in laminate peeling strength and, in particular, blocking resistance.

In addition, when the amount of resin added to and included in the ink is increased so as to obtain a sufficient laminate peeling strength and blocking resistance, the viscosity of the ink may increase and the clogging recovery property in the nozzle of the ink jet head may decrease, causing difficulties.

The ink set according to the present embodiment includes a resin liquid composition containing a urethane resin (also referred to below as a "specific resin") having a specific structure and an acid value within a specific range. According to the ink set including the resin liquid composition containing the specific resin and the colored ink composition containing a pigment, it is possible to achieve both excellent laminate peeling strength and blocking resistance in the recorded material and an excellent clogging recovery property.

By a specific resin being contained in the resin liquid composition as in the ink set according to the present embodiment and attaching the above to the recording medium separately from the colored ink composition, it is possible to concentrate the specific resin at the interfaces of the colored ink composition layer, that is, the interface between the recording medium and a colored ink composition layer and the interface between the colored ink composition layer and the air layer. Due to this, it is possible to reduce the amount of pigment present at the interfaces of the colored ink composition layer; thus, it is presumed that it is possible to prevent decreases in the laminate peeling strength and blocking resistance caused by the presence of the pigment.

On the other hand, in the case of a specific resin being contained in the colored ink composition without using a resin liquid composition, in order to obtain sufficient laminate peeling strength and blocking resistance, that is, to concentrate a sufficient amount of the specific resin at the interfaces in the colored ink composition layer, it is necessary to use a large amount of the specific resin with respect to the colored ink composition. When a large amount of resin is contained in the colored ink composition in this manner, the viscosity of the ink tends to increase. In addition, in order to reduce the increase in viscosity, it is necessary to reduce the amount of organic solvent able to be contained therein, and it is not possible to sufficiently obtain the moisturizing effect of the organic solvent. Furthermore, it is presumed that another factor is that, due to a large amount of the specific resin being contained, both the specific resin and the pigment enter a state in which the dispersion stability is easily decreased. Accordingly, when the specific resin is contained in the colored ink composition, it is not possible to achieve both print image quality and ejection reliability such as a clogging recovery property. In particular, the problem is remarkable when the colored ink composition is a white ink containing a white pigment. This is because the pigment content in white inks is higher than that in non-white inks and because, when a large amount of resin is added, the viscosity is higher and the clogging recovery property is easily decreased.

In contrast, according to the ink set according to the present embodiment, it is possible to maintain the viscosity of the colored ink composition, in particular, the white ink, at an appropriate viscosity and to achieve both excellent laminate peeling strength and blocking resistance and excellent print image quality and ejection reliability such as a clogging recovery property.

Ink set means that the inks provided in the ink set are used as a set for recording. In other words, two or more inks used as a set for recording are called an ink set. The inks provided in an ink set may be accommodated in respective individual ink containers. Examples of ink containers include packs, bottles, jars, and the like. The ink container may be a cartridge able to be mounted on a printer.

A description will be given below of the resin liquid composition and colored ink composition forming the ink set according to the present embodiment and of a recorded material using the ink set according to the present embodiment.

1.1. Resin Liquid Composition

The water-based resin liquid composition forming the ink set according to the present embodiment contains a urethane resin having an alicyclic structure or an aromatic ring structure and an acid value of 50 to 100 mg KOH/g. A description will be given below of each component contained in the resin liquid composition.

1.1.1. Urethane Resin

Urethane resins are resins polymerized using a polyisocyanate and are polymerized using at least a polyisocyanate and a polyol and/or a polyamine. In particular, urethane resins are polymerized using a polyisocyanate and a polyol. In addition, polyols and polyamines as cross-linking agents and chain extenders are further used for the polymerization as necessary.

A urethane resin is a polyurethane including one or more groups selected from a urethane bond (urethane group), which is produced by a reaction between an isocyanate group and a hydroxyl group, and a urea bond (urea group), which is produced by a reaction between an isocyanate group and an amino group, and urethane resins may be linear or branched.

Furthermore, when referring to polyurethanes, polyurethanes having thermoplasticity with or without a cross-linked structure, and polyurethanes which do not exhibit, or hardly exhibit, a Tg or melting point due to being formed with a cross-linked structure are also included.

The isocyanate groups for forming the urethane bond are supplied by compounds including isocyanate groups. In addition, the hydroxyl groups (hydroxyl groups) for forming urethane bonds are supplied by compounds including hydroxyl groups. To carry out polymerization, for compounds having isocyanate groups, two or more isocyanate groups are selected and polymerized, while for compounds having hydroxyl groups, two or more hydroxyl groups are selected and polymerized.

In the present specification, compounds having two or more isocyanate groups may be referred to as polyisocyanates and compounds having two or more hydroxyl groups may be referred to as polyols. Among the above, compounds having two isocyanate groups may be referred to as diisocyanates, and compounds having two hydroxyl groups may be referred to as diols.

In addition, the molecular chains between the isocyanate groups of the polyisocyanate, the molecular chains between the hydroxyl groups of the polyol, and the molecular chains between the amino groups of the polyamine are the portions other than the urethane bonds or urea bonds in a case of becoming a polyurethane. In the present specification, all or parts of the portions other than the urethane bonds or urea bonds in a case of becoming a polyurethane may be referred to as the skeleton. It is possible for the skeleton to be linear or branched.

In addition, the polyurethane may also include bonds other than urethane bonds and urea bonds, and examples of such bonds include urea bonds produced by the reaction of a plurality of isocyanate bonds with water, biuret bonds produced by the reaction of urea bonds with isocyanate groups, allophanate bonds produced by the reaction of urethane bonds with isocyanate groups, uretdione bonds formed by dimerization of isocyanate groups, isocyanurate bonds formed by trimerization of isocyanate groups, and the like. It is possible to actively produce or not produce these bonds according to the reaction temperature and the like. Accordingly, for example, when a polyisocyanate, a polyol, and a polyamine coexist in a reaction system, it is possible to produce polyurethanes including these bonds (groups) as well as urethane bonds and urea bonds. Having an allophanate structure, a biuret structure, a uretdione structure, and an isocyanurate structure may increase adhesion to the recording medium, increase film strength, and improve abrasion resistance.

In the present specification, regarding polyamines, compounds having two or more amino groups are also referred to as polyamines, which is the same as the designation for polyisocyanates and polyols described above.

The urethane resin is a reaction product of a polyisocyanate and an active hydrogen compound. The urethane resin contained in the resin liquid composition used in the ink set according to the present embodiment has an alicyclic structure or an aromatic ring structure. For this reason, the urethane resin is obtained by polymerization using a component having an alicyclic structure or an aromatic ring structure. In particular, urethane resins obtained by polymerization using at least a polyisocyanate and a polyol having an alicyclic structure or aromatic ring structure are preferable. Furthermore, the polymerization may be carried out using polyamines, and it is possible to use polyols, polyamines, and the like as cross-linking agents and chain extenders as necessary. The polyol or polyamine may be a component having an alicyclic structure or aromatic ring structure. A description will be given below of the constituent components of the urethane resin.

1.1.1.1. Polyisocyanate

The polyisocyanate is, for example, a polyisocyanate monomer and/or a polyisocyanate derivative, or the like. Examples of polyisocyanate monomers include aromatic polyisocyanates, alicyclic polyisocyanates, aliphatic polyisocyanates, and the like. The urethane resin contained in the water-based resin liquid composition forming the ink set according to the present embodiment has an alicyclic structure or an aromatic ring structure and therefore at least one selected from an aromatic polyisocyanate and an alicyclic polyisocyanate is preferably used as the polyisocyanate monomer. When the urethane resin contained in the resin liquid composition has an alicyclic structure or an aromatic ring structure, in particular, the wettability to recording media formed of polyolefin-based non-polar materials tends to improve and it is possible to uniformly coat the resin liquid composition. Due to this, it is possible to reduce the pigment present at the interface between the colored ink composition layer and the recording medium in particular and to prevent decreases in the laminate peeling strength and blocking resistance.

Examples of aromatic polyisocyanates include 2,4- or 2,6-tolylene diisocyanate or mixtures thereof (TDI), m- or p-phenylene diisocyanate or mixtures thereof, 4,4'-diphenyl diisocyanate, 1,5-naphthalene diisocyanate (NDI), 4,4'-, 2,4'-, or 2,2'-diphenylmethane diisocyanate or mixtures thereof (MDI), 4,4'-toluidine diisocyanate (TODI), 1,3- or 1,4-bis(isocyanate methyl)benzene or mixtures thereof (XDI), 1,3- or 1,4-bis(isocyanate propyl)benzene or mixtures thereof (TMXDI), $\omega,\omega'$-diisocyanate-1,4-diethylbenzene, and the like.

Examples of alicyclic polyisocyanates include 1,3-cyclopentane diisocyanate, 1,3-cyclopentene diisocyanate, 1,4-cyclohexane diisocyanate, 1,3-cyclohexane diisocyanate, isophorone diisocyanate (IPDI), 4,4'-, 2,4'-, or 2,2'-dicyclohexylmethane isocyanate, methyl-2,4-cyclohexane diisocyanate, methyl-2,6-cyclohexane diisocyanate, norbornane diisocyanate (various isomers or mixtures thereof) (NBDI), 1,3- or 1,4-bis(isocyanate)methylcyclohexane or mixtures thereof (H6XDI), and the like.

Examples of aliphatic polyisocyanates include ethylene diisocyanate, trimethylene diisocyanate, 1,2-propylene diisocyanate, tetramethylene diisocyanate, 1,2-butylene diisocyanate, 2,3-butylene diisocyanate, 1,3-butylene diisocyanate, 1,5-pentamethylene diisocyanate (PDI), 1,6-hexamethylene diisocyanate (HDI), and the like.

It is possible to use these polyisocyanate monomers alone or in a combination of two or more.

Examples of polyisocyanate derivatives include multimers of the polyisocyanate monomers described above, allophanate modified products, polyol modified products, biuret modified products, urea modified products, oxadiazinetrione modified products, carbodiimide modified products, uretdione modified products, urethonimine modified products, and the like.

Further, polyisocyanate derivatives include polymethylene polyphenylene polyisocyanate (also known as polymeric MDI or Crude MDI), and the like.

The urethane resin contained in the water-based resin liquid composition forming the ink set according to the present embodiment is preferably a urethane resin having, from among these polyisocyanates, one or more selected from dicyclohexylmethane diisocyanate, isophorone diisocyanate, 1,3-bis(isocyanate methyl)cyclohexane, m-bis(isocyanate propyl)benzene, and m-bis(isocyanate methyl)benzene as a constituent component. Here, "used as a constituent component" indicates being used as a raw material for synthesizing a urethane resin and that the urethane resin has a structure resulting therefrom. When the urethane resin contained in the resin liquid composition uses these polyisocyanates as a constituent component, in particular, the wettability to recording media formed of polyolefin-based non-polar materials tends to be further improved. Therefore, it tends to be possible to more uniformly coat the resin liquid composition and to further improve the laminate peeling strength and blocking resistance as a result.

In addition, the dicyclohexylmethane diisocyanate may be a mixture of dicyclohexylmethane 4,4'-diisocyanate, dicyclohexylmethane 2,2'-diisocyanate, and dicyclohexylmethane 2,4'-diisocyanate, or any single substance of each. Furthermore, the above may be used as multifunctional isocyanates formed of dimers or higher of any combination thereof. A multifunctional polyisocyanate is a compound which has a structure formed of two or more molecules of polyisocyanate and has two or more isocyanate groups at the terminal of the molecule in order to react with the OH groups and $NH_2$ groups such as polyols and polyamines. These multifunctional polyisocyanates may include at least one selected from the group formed of an allophanate structure, a uretdione structure, an isocyanurate structure, and a biuret structure.

A multifunctional polyisocyanate is a structure formed of polyisocyanate with two or more molecules of monomeric diisocyanate or polymeric polyisocyanate, which may have many branches in the molecules. Polymers having such a structure formed of multifunctional polyisocyanates have a structure in which the molecules are intertwined in a three-dimensionally complex manner such that the urethane bonds enter a densely concentrated state. Accordingly, it is possible to carry out dispersion stably in a resin liquid composition even with a relatively low acid value. By using these polyisocyanates, it may be possible to improve the adhesion of a formed image to the recording medium.

In addition, the polyisocyanate may have a structure formed of two or more molecules of a polyisocyanate. The structure formed of two or more molecules of a polyisocyanate is, for example, a uretdione structure or an isocyanurate structure. If such a polyisocyanate is selected, the polyurethane has a structure in which the molecules are intertwined in a three-dimensionally complex manner such that the urethane bonds enter a densely concentrated state. Accordingly, for example, it is possible to carry out dispersion stably in a resin liquid composition even with a relatively low acid value.

In the present specification, the polyurethane skeleton refers to the molecular chains between the functional groups. Accordingly, the urethane resin contained in the water-based resin liquid composition forming the ink set according to the present embodiment has a skeleton derived from the molecular chains of the raw materials such as polyisocyanates, polyols, and polyamines. Other skeletons are not particularly limited, but are, for example, substituted, unsubstituted, saturated, unsaturated, or aromatic chains, and such chains may have carbonate bonds, ester bonds, amide bonds, and the like. The type and number of substituents in the skeleton are not particularly limited and may include alkyl groups, hydroxyl groups, carboxyl groups, amino groups, sulfonyl groups, phosphonyl groups, and the like.

1.1.1.2. Polyol

It is possible to obtain the urethane resin contained in the water-based resin liquid composition forming the ink set according to the present embodiment with a polyol as a raw material. The polyol is not particularly limited as long as the polyol is a bifunctional or higher compound, that is, a compound having two or more hydroxyl groups. Examples of polyols include alkylene glycols, polyester polyols, polyether polyols, polycarbonate diols, and the like.

Examples of alkylene glycols include ethylene glycol, diethylene glycol, triethylene glycol, tetraethylene glycol, polyethylene glycol, 1,2-propylene glycol, 1,3-propanediol, tripropylene glycol, polypropylene glycol, polytetramethylene glycol, hexamethylene glycol, tetramethylene glycol, neopentyl glycol, 1,2-butanediol, 1,3-butanediol, 1,4-butanediol, 1,2-pentanediol, 1,5-pentanediol, 1,2-hexanediol, 1,6-hexanediol, 3-methyl-1,5-pentanediol, 1,2-cyclohexanediol, 1,4-cyclohexanediol, 1,4-cyclohexanedimethanol, 4,4-dihydroxyphenylpropane, 4,4-dihydroxyphenylmethane, glycerin, trimethylolethane, trimethylolpropane, 1,2,5-hexantriol, 1,2,6-hexantriol, pentaerythritol, trimethylol melamine, polyoxypropylenetriol, dimethyl-1,3-pentanediol, diethyl-1,3-pentanediol, dipropyl-1,3-pentanediol, dibutyl-1,3-pentanediol, 2-butyl-2-ethyl-1,3-propanediol, and the like. As the polytetramethylene glycols, it is possible to use commercially available products, for example, PTMG250, PTMG2000, PTMG3000, and PTMG4000 manufactured by Mitsubishi Chemical Corporation, PTG and PTMG-L manufactured by Hodogaya Chemical, and the like.

Among the above, the urethane resin contained in the water-based resin liquid composition forming the ink set according to the present embodiment preferably uses polytetramethylene glycol as a constituent component. When polytetramethylene glycol is used as a raw material for polyurethane, the polytetramethylene glycol penetrates the three-dimensional network structure formed in the polyurethane and reacts with the isocyanate to form urethane bonds, which tends to obtain a urethane resin with a better balance of strength and flexibility. Due to this, the laminate peeling strength and blocking resistance tend to be further improved.

In addition, when polytetramethylene glycol is used as a raw material for the polyurethane, the number average molecular weight thereof is preferably 200 or more and 4000 or less, more preferably 500 or more and 3000 or less, and particularly preferably 1000 or more and 2500 or less. When the number average molecular weight is 500 or more, the density of the urethane bonds in the polyurethane is not increased excessively and it is possible to suppress the rigidity of the molecular chain derived from the polytetramethylene glycol. Due to this, the flexibility of the polyurethane may be increased and the laminate peeling strength may be improved. In addition, if the number average molecular weight of the polytetramethylene glycol which reacts with the polyisocyanate is 3000 or less, the density of the urethane bond in the polyurethane is not excessively small, the extensibility of the molecular chain derived from the polytetramethylene glycol does not increase excessively, and the flexibility of the polyurethane is suppressed, which may make tackiness less likely to occur and may improve blocking resistance. Accordingly, the number average molecular weight of the polytetramethylene glycol being 500 or more and 3000 or less improves the balance between the strength and flexibility of the film (image) formed by the polyurethane, thus, it tends to be possible to further improve the laminate peeling strength and blocking resistance.

In the disclosure, "number average molecular weight" is the total weight of the polymer divided by the total number of molecules forming the polymer and is measured by the GPC method.

Examples of polyester polyols include acid esters and the like. Examples of the acid components forming acid esters include aliphatic dicarboxylic acids such as malonic acid, succinic acid, tartaric acid, oxalic acid, glutaric acid, adipic acid, pimelic acid, suberic acid, azelaic acid, sebacic acid, alkyl succinic acid, linolenic acid, maleic acid, fumaric acid, mesaconic acid, citraconic acid, and itaconic acid, alicyclic dicarboxylic acids such as phthalic acid, naphthalene dicarboxylic acid, biphenyldicarboxylic acid, tetrahydrophthalic acid, and aromatic hydrogenated additives, and the like. It is also possible to use anhydrides, salts, alkyl esters, acid halides, and the like of these acid components as the acid components. In addition, the alcohol component forming the acid ester is not particularly limited and it is possible to give the diol compounds described above as examples thereof.

Examples of polyether polyols include addition polymerization products of alkylene oxides and condensation polymerization products of polyols such as (poly)alkylene glycols. Examples of alkylene oxides include ethylene oxide, propylene oxide, butylene oxide, α-olefin oxide, and the like. Examples of (poly)alkylene glycols include polyethylene glycol (polyoxyethylene glycol), polypropylene glycol (polyoxypropylene glycol), polybutylene glycol, and the like. Among the above, when a polyoxypropylene glycol is used, it tends to improve the flexibility of the polyurethane and to improve the abrasion resistance and glossiness when printed on a film. As the polyoxypropylene glycol, it is possible to use commercially available products, for example, the Excenol series manufactured by AGC Chemicals, the Newpol PP series manufactured by Sanyo Chemical, Ltd., the Uniol D series manufactured by NOF Corporation, or the like.

Polycarbonate diols include a molecular chain having two hydroxyl groups and a carbonate bond.

Examples of polycarbonate diols able to be used as part or all of the polyol in the present embodiment include polycarbonate diols obtained by reacting carbonate components such as alkylene carbonate, diaryl carbonate, and dialkyl carbonate, with phosgene and an aliphatic polyol component, as well as alkanediol-based polycarbonate diols such as polyhexamethylene carbonate diols. Using a polycarbonate diol as a starting material for polyurethanes tends to improve the heat resistance and hydrolysis resistance of the produced polyurethanes.

Using a polycarbonate diol as the polyether tends to make it possible to further improve the abrasion resistance of the obtained image, since the polyurethane has a skeleton derived from the polycarbonate diol.

Polycarbonate diols, which are suitable as a raw material for the urethane resin contained in the water-based resin liquid composition forming the ink set according to the present embodiment, generally have two hydroxyl groups in a molecule and are able to be obtained by an ester exchange reaction between a diol compound and a carbonate ester. Examples of diol compounds include 1,4-butanediol, 1,3- butanediol, 1,2-butanediol, 1,5-pentanediol, 1,2-pentanediol, 1,6-hexanediol, 1,5-hexanediol, 1,2-hexanediol, 1,7-heptanediol, 1,8-octanediol, 1,2-octanediol, 1,9-nonanediol, 1,10-decanediol, neopentyl glycol, 4-methyl-1,5-pentanediol, 2-methyl 1,3-propanediol, 2-methyl-1,8-octanediol, 2-isopropyl-1,4-butanediol, 2-ethyl-1,6-hexanediol, 3-methyl-1,5-pentanediol, 2,4-dimethyl-1,5-pentanediol, 2,4-diethyl-1,5-pentanediol, 1,3-butanediol, 2-ethyl-1,3-hexanediol, 2-butyl-2-ethyl-1,3-propanediol, 1,4-cyclohexanedimethanol, 1,3-cyclohexanediol, 1,4-cyclohexanediol, and the like. It is possible to use one or two or more of the above in combination. In addition, among the above diols, neopentyl glycol, 4-methyl-1,5-pentanediol, 2-methyl 1,3-propanediol, 2-methyl-1,8-octanediol, 2-isopropyl-1,4-butanediol, 2-ethyl-1,6-hexanediol, 3-methyl-1,5-pentanediol, 2,4-dimethyl-1,5-pentanediol, 2,4-diethyl-1,5-pentanediol, which are less likely to be crystallized, are more preferable.

Carbonate esters able to be used in the manufacturing of polycarbonate diols are not limited as long as the effects of the disclosure are not impaired and examples thereof include dialkyl carbonates, diaryl carbonates, or alkylene carbonates. Among the above, diaryl carbonates are preferable from the viewpoint of reactivity. Specific examples of carbonate compounds include dimethyl carbonate, diethyl carbonate, dibutyl carbonate, diphenyl carbonate, ethylene carbonate, and the like, and diphenyl carbonate is more preferable.

As commercially available products of polycarbonate diols, for example, there are Mitsubishi Chemical Corporation's BENEBiOL series of NL1010DB, NL2010DB, NL3010DB, NL1010B, NL2010B, NL3010B, NL1050DB, NL2050DB, and NL3050DB, Asahi Kasei Corporation's Duranol series, Tosoh Corporation's Nipolon series, Kuraray Co., Ltd.'s polyhexanediol carbonate, Daicel Corporation's Placcel series and CDCD205PL, Ube Industries, Ltd.'s ETERNACOLL series, and the like.

When a polyol is used as a raw material for the urethane resin contained in the water-based resin liquid composition forming the ink set according to the present embodiment, it is more preferable that an acid group is present in the molecule of the polyol. Examples of acid group-containing diols include dimethylol acetic acid, dimethylol propionic acid (DMPA), dimethylol butanoic acid, dimethylol butyric acid, and the like. Among the above, dimethylolpropionic acid and dimethylol butanoic acid are even more preferable. Since the resin liquid composition forming the ink set according to the present embodiment is water-based, it is more preferable that the polyurethane is polymerized with such acid group-containing diols as raw materials.

The urethane resin polymerized using such a component is mainly formed of two types of segments, which are hard segments and soft segments. The hard segment is formed of polyisocyanate, short-chain polyols, polyamines, cross-linking agents, chain extenders, and the like and mainly contributes to the strength of the polyurethane. On the other hand, the soft segment is formed of long-chain polyols and the like and mainly contributes to the flexibility of the resin. The film formed by the polyurethane when the resin liquid composition is attached to the recording medium has a microphase-separated structure of these hard segments and soft segments and thus has both strength and flexibility, as well as high elasticity. These film characteristics contribute to the improvement of the laminate peeling strength and blocking resistance of the recorded material.

1.1.1.3. Other Components of Urethane Resin Polyamine

A polyamine may be included in the raw material of the urethane resin contained in the water-based resin liquid composition forming the ink set according to the present embodiment. The polyamine is not particularly limited as long as the polyamine is a compound having a bifunctional or higher amino group.

Examples of polyamines include aliphatic diamines such as ethylenediamine, propylenediamine, 2,2-dimethyl-1,3-propanediamine, 2-methyl-1,5-pentanediamine, trimethylhexanediamine, 2-butyl-2-ethyl-1,5-pentanediamine, 1,8-octanediamine, 1,9-nonanediamine, and 1,10-decanediamine, diethylenetriamine, hexylenediamine, triethylenetetramine, tetraethylenepentamine, isophoronediamine, xylirenediamine, diphenylmethanediamine, hydrogenated diphenylmethanediamine, hydrazine, polyamide polyamine, polyethylene polyimine, 1-amino-3-aminomethyl-3,5,5-trimethylcyclohexane, dicyclohexylmethanediamine, bicycloheptanedimethanamine, menthenediamine, diaminodicyclohexylmethane, isopropyritin cyclohexyl-4,4'-diamine, 1,4-diaminocyclohexane, 1,3-bisaminomethylcyclohexane, and the like.

Many of the compounds commonly used as polyamines have a molecular weight equivalent to that of short-chain polyols and are basically the urea groups and biuret groups which are the hard segments of polyurethane. Including urea groups in the formed polymer makes it possible to call the polymer a urea resin.

It is also possible to use a polyamine as a component to react with a multifunctional polyisocyanate, a chain extender, or a cross-linking agent; however, when the isocyanate group reacts with the amino group, a urea bond is formed. Accordingly, when a polyamine is used, it is also possible to determine the usage amount thereof such that the ratio of urea group/urethane group in the polyurethane is a desired ratio and to control the physical properties of the polyurethane.

Cross-Linking Agents and Chain Extenders

The urethane resin contained in the water-based resin liquid composition forming the ink set according to the present embodiment may include a cross-linking agent and/or a chain extender.

The cross-linking agent is used when synthesizing the prepolymer and the chain extender is used during a chain extension reaction after the synthesis of the prepolymer. As the cross-linking agents and chain extenders, it is possible to appropriately select and use the polyisocyanates, polyols, polyamines, and the like described above, depending on the application, such as cross-linking or chain extension.

A chain extender is, for example, a compound which reacts with the isocyanate group in which a urethane bond is not formed, in the polyisocyanates described above. Examples of compounds able to be used as chain extenders include the polyols, polyamines, and the like described above. In addition, it is also possible to use compounds able to cross-link polyurethane as chain extenders. Examples of compounds able to be used as chain extenders include low molecular weight polyols, polyamines, and the like with a number average molecular weight of less than 500.

In addition, examples of the cross-linking agents include trifunctional or higher cross-linking agents from among polyisocyanates, polyols, and polyamines. Examples of multifunctional polyisocyanates which are trifunctional or higher include polyisocyanates having an isocyanurate structure and polyisocyanates having an allophanate or biuret structure. As polyols, it is possible to use glycerin, trimethylolpropane, pentaerythritol, polyoxypropylenetriol, and the like. Examples of trifunctional or higher polyamines include trialcoholamines such as triethanolamine and triisopropanolamine, amines having trifunctional or higher amino groups such as diethylenetriamine and tetraethylene pentamine, and the like.

It is possible to determine the presence or absence of cross-linking of the polyurethane by a gel fraction, which is calculated by calculating the ratio of a gel fraction to a sol fraction using the phenomenon that polyurethane having a cross-linked structure does not dissolve in a solvent and swells. The gel fraction is an index of the degree of cross-linking measured from the solubility of the solidified polyurethane and the higher the degree of cross-linking, the higher the gel fraction tends to be.

1.1.1.4. Synthesis of Urethane Resin

The urethane resin contained in the water-based resin liquid composition forming the ink set according to the present embodiment may be resin particles. In this manner, when the resin is in the form of particles, that is, resin particles, since the resin particles fuse and adhere to each other as the resin liquid composition dries, the fixation of the image portion of the recorded material tends to be improved and it may be possible to further improve the laminate peeling strength and blocking resistance. It is possible to obtain resin particles formed of urethane resin using known methods. Examples will be given below.

A polyisocyanate and a compound which reacts therewith (a polyol and, as necessary, a polyamine or the like) are reacted to increase the usage amount of isocyanate groups, and a prepolymer having isocyanate groups at the terminals of the molecules is polymerized. At this time, as necessary, an organic solvent, which has a boiling point of 100° C. or lower and has no reaction groups with the isocyanate groups, such as methyl ethyl ketone, acetone, or tetrahydrofuran, may be used. This is generally referred to as the prepolymer method.

When an acid group-containing diol is used as a raw material, the acid groups of the prepolymer are neutralized using a substance acting as counter ions, such as an organic base such as N,N-dimethylethanolamine, N,N-diethylethanolamine, diethanolamine, triethanolamine, triisopropanolamine, trimethylamine, or triethylamine, or an inorganic base such as sodium hydroxide, potassium hydroxide, or ammonia. Neutralizers including alkali metals such as sodium hydroxide and potassium hydroxide are preferably used to improve the dispersion stability of polyurethane. By using these neutralizers as preferably 0.5 to 1.0 mole per mole of acid groups of the prepolymer, and more preferably 0.8 to 1.0 mole, an increase in viscosity is less likely to occur and workability is improved.

Thereafter, the prepolymer is added to the liquid including the chain extender or cross-linking agent and the chain extension or cross-linking reaction is performed. Next, when an organic solvent was used, removal thereof is carried out using an evaporator or the like to obtain a dispersion of resin particles of the urethane resin.

As catalysts used for the polymerization reaction of polyurethane, titanium catalysts, aluminum catalysts, zirconium catalysts, antimony catalysts, germanium catalysts, bismuth catalysts, and metal complex-based catalysts are good. In particular, titanium catalysts, specifically, tetraalkyl titanates such as tetrabutyl titanate and tetramethyl titanate, oxalic acid metal salts such as titanium potassium oxalate, and the like are preferable. In addition, other catalysts are not particularly limited within known catalysts, but examples thereof include tin compounds such as dibutyltin oxide and dibutyltin dilaurate. As non-heavy metal catalysts, acetylacetonato complexes of transition metals such as titanium, iron, copper, zirconium, nickel, cobalt, and manganese have long been known to have a urethanation activity. In recent years, as environmental awareness has increased, low toxicity catalysts able to replace highly toxic heavy metal catalysts have become desirable and the high urethanation activity of titanium/zirconium compounds in particular has been utilized. In particular, in the field of flexible packaging, for plastic films, the proportion of food applications is large, thus, the possibility that highly toxic metal catalysts will be unusable is high.

1.1.1.5. Acid Value of Urethane Resin

The acid value of the urethane resin contained in the water-based resin liquid composition forming the ink set according to the present embodiment is 50 mg KOH/g or more and 100 mg KOH/g or less, preferably 60 mg KOH/g or more and 95 mg KOH/g or less, more preferably 65 mg KOH/g or more and 90 mg KOH/g or less, even more preferably 70 mg KOH/g or more and 85 mg KOH/g or less, and particularly preferably 75 mg KOH/g or more and 85 mg KOH/g or less. When the acid value of the urethane resin is less than 50 mg KOH/g, the laminate peeling strength tends to be inferior. This is presumed to be because the effect of the acid group in improving adhesion is insufficient. On the other hand, even when the acid value of the urethane resin is higher than 100 mg KOH/g, the laminate peeling strength tends to be inferior. This is presumed to be because, when the acid value is high, water absorption and moistening tend to occur and the urethane resin swells with water. In addition, from the point of view of blocking resistance, when the acid value of the urethane resin is high, the result is inferior and a lower acid value is more preferable. Accordingly, by setting the acid value of the urethane resin to 50 mg KOH/g or more and 100 mg KOH/g or less, it is possible to achieve both excellent laminate peeling strength and blocking resistance.

In addition, it is possible to measure the acid value of the polyurethane by a titration method. The acid value is measured using, for example, "AT610" manufactured by Kyoto Electronics Manufacturing Co., Ltd., as a titration device and calculated by applying the numerical values to Equation (1).

$$\text{Acid value (mg/g)} = (EP1 - BL1) \times FA1 \times C1 \times K1 / \text{SIZE} \quad (1)$$

(In Equation (1), EP1 represents a titration volume (mL), BL1 represents a blank value (0.0 mL), FA1 represents a titrant factor (1.00), C1 represents a concentration equivalent value (5.611 mg/mL) (equivalent amount of potassium hydroxide in 1 mL of 0.1 mol/L KOH), K1 represents coefficient (1), and SIZE represents sample collection volume (g), respectively.

For example, it is possible to carry out the measurement in accordance with JIS K0070, at which time it is possible to use an ethanol solution of sodium hydroxide as a titrating reagent.

It is possible to change the acid value of the polyurethane, for example, by regulating the content of the skeleton derived from a carboxyl group-containing glycol (acid group-containing polyol such as dimethylolpropionic acid). The water-based resin liquid composition forming the ink set according to the present embodiment is preferably a polyurethane having a carboxyl group with a carboxyl group-containing glycol to make it possible to easily carry out dispersion in water.

The water-based resin liquid composition forming the ink set according to the present embodiment may contain a plurality of resins formed of the polyurethane (urethane resin) described above and polyurea (urea resin). In addition, the polyurethane may be added in the form of an emulsion.

1.1.1.6. Resin Content

The water-based resin liquid composition forming the ink set according to the present embodiment may contain a plurality of the resins described above. The content of urethane resin in the resin liquid composition is preferably 1% by mass or more as a solid content. In addition, the content is preferably 15% by mass or less. Furthermore, the content is preferably 1% by mass or more and 15% by mass or less, and more preferably 2% by mass or more and 10% by mass or less. Furthermore, 3% by mass or more and 7% by mass or less is particularly preferable. When the content of resin in the resin liquid composition is within the above ranges, it tends to be possible to exhibit good laminate peeling strength and blocking resistance while maintaining an appropriate viscosity of the resin liquid composition.

1.1.2. Water

The water-based resin liquid composition forming the ink set according to the present embodiment contains water. In the disclosure, "water-based" means that water is one of the main solvents. Water is the main medium of the resin liquid composition and is a component which is evaporated and scattered by drying. The water is preferably pure water or ultrapure water such as ion exchange water, ultrafiltration water, reverse osmosis water, or distilled water, in which ionic impurities are removed as much as possible. In addition, when using water sterilized by ultraviolet irradiation, hydrogen peroxide addition, or the like, it is possible to suppress the generation of mold and bacteria in a case where the resin liquid composition is stored for a long period of time, which is suitable.

The content of water in the resin liquid composition is preferably 40% by mass or more, more preferably 45% by mass or more, even more preferably 50% by mass or more, and particularly preferably 60% by mass or more. The upper limit is preferably 99% by mass or less.

1.1.3. Organic Solvent

The water-based resin liquid composition forming the ink set according to the present embodiment may include an organic solvent. Including an organic solvent makes it possible to effectively suppress the evaporation of water from the recording head during long-term storage while obtaining excellent ejection stability of the resin liquid composition by the ink jet method.

As the organic solvent used for the resin liquid composition, a water-soluble organic solvent is preferable. Using a water-soluble organic solvent makes the drying property of the resin liquid composition more favorable and makes it possible to obtain an image having excellent image quality and abrasion resistance.

Water-soluble organic solvents are not particularly limited and examples thereof include alkanediols, polyols, nitrogen-containing solvents, esters, glycol ethers, cyclic esters, and the like.

Examples of alkanediols include 1,2-pentanediol, 1,2-hexanediol, 1,2-octanediol, and the like, which are 1,2-alkanediols, and 1,6-hexanediol, and the like. It is possible to use the above as one alone or in a mixture of two or more. Alkanediols increase the wettability of the resin liquid composition to the recording medium for an excellent uniform wetting effect. Among the above, 1,2-alkanediols are particularly preferable. Preferable examples of alkanediols include diols of alkanes with five or more carbon atoms. The alkane preferably has 5 to 9 carbon atoms and may be linear or branched. The content of the alkanediols in the resin liquid composition is preferably 1% by mass or more and 20% by mass or less, more preferably 1.5% by mass or more and 15% by mass or less, and even more preferably 2% by mass or more and 10% by mass or less.

Examples of polyols include ethylene glycol, propylene glycol, 1,2-propanediol, 1,2-butanediol, 1,3-propanediol, 1,4-butanediol, diethylene glycol, triethylene glycol, dipropylene glycol, 2-ethyl-2-methyl-1,3-propanediol, 2-methyl-2-propyl-1,3-propanediol, 2-methyl-1,3-propanediol, 2,2-dimethyl-1,3-propanediol, 3-methyl-1,3-butanediol, 2-ethyl-1,3-hexanediol, 3-methyl-1,5-pentanediol, 2-methylpentane-2,4-diol, trimethylolpropane, glycerin, and the like. It is possible to use the above as one alone or in a mixture of two or more. Polyols have excellent effects as moisturizing agents. Preferable examples of polyols include alkanes with four or fewer carbon atoms which have two or more hydroxyl groups, or polyols in which alkanes with four or fewer carbon atoms which have two or more hydroxyl groups are intermolecularly condensed through the hydroxyl groups. For condensation products, the number of condensations is preferably 2 to 4. Here, polyols are compounds having two or more hydroxyl groups in their molecules and, in the present embodiment, the number of hydroxyl groups is preferably 2 or 3. The content of the polyols in the resin liquid composition is preferably 1% by mass or more and 30% by mass or less, more preferably 2% by mass or more and 20% by mass or less, and even more preferably 3% by mass or more and 10% by mass or less.

Examples of nitrogen-containing solvents include pyrrolidones such as N-methyl-2-pyrrolidone, N-ethyl-2-pyrrolidone, N-vinyl-2-pyrrolidone, 2-pyrrolidone, N-butyl-2-pyrrolidone, 5-methyl-2-pyrrolidone, and the like. It is possible to use the above as one alone or in a mixture of two or more. Nitrogen-containing solvents tend to act as good dissolving agents for the resin and make it possible to obtain a recorded material with excellent abrasion resistance.

Possible examples of nitrogen-containing solvents also include alkoxyalkylamides, for example, 3-methoxy-N,N-dimethylpropionamide, 3-methoxy-N,N-diethylpropionamide, 3-methoxy-N,N-methylethylpropionamide, 3-ethoxy-N,N-dimethylpropionamide, 3-ethoxy-N,N-diethylpropionamide, 3-ethoxy-N,N-methylethylpropionamide, 3-n-butoxy-N,N-dimethylpropionamide, 3-n-butoxy-N,N-diethylpropionamide, 3-n-butoxy-N,N-methylethylpropionamide, 3-n-propoxy-N,N-dimethylpropionamide, 3-n-propoxy-N,N-diethylpropionamide, 3-n-propoxy-N,N-methylethylpropionamide, 3-iso-propoxy-N,N-dimethylpropionamide, 3-iso-propoxy-N,N-diethylpropionamide, 3-iso-propoxy-N,N-methylethylpropionamide, 3-tert-butoxy-N,N-dimethylpropionamide, 3-tert-butoxy-N,N-diethylpropionamide, 3-tert-butoxy-N,N-methylethylpropionamide, and the like.

Examples of nitrogen-containing solvents also include amide-based solvents. As amide-based solvents, cyclic amide-based solvents and acyclic amide-based solvents are preferable. Examples of cyclic amide-based solvents include the pyrrolidones described above, and the like. Examples of acyclic amide-based solvents include the alkoxyalkylamides described above.

When the resin liquid composition includes a nitrogen-containing solvent, the content of the nitrogen-containing solvent with respect to the resin liquid composition is preferably 1% by mass or more, more preferably 5% by mass or more, and even more preferably 10% by mass or more.

On the other hand, the content of the nitrogen-containing solvent with respect to the resin liquid composition is preferably not contained as more than 30% by mass (30% by mass or less), preferably not contained as more than 20% by mass, preferably not contained as more than 10% by mass, more preferably not contained as more than 5% by mass, even more preferably not contained as more than 1% by mass, and particularly preferably no nitrogen-containing solvent is contained. When the organic solvent contains nitrogen-containing solvents, while good film-forming properties of the resin liquid coating film on the recording medium are obtained, it may also cause the resin to be dissolved or welded inside the ink jet head, in particular, in the case of a resin liquid composition which does not include a high-boiling point solvent such as glycerin, the water easily evaporates and the resin is easily dissolved or welded. Therefore, when the content of nitrogen-containing solvent with respect to the resin liquid composition is within the above ranges, a good clogging recovery property tends to be obtained.

Esters include glycol monoacetates such as ethylene glycol monomethyl ether acetate, ethylene glycol monoethyl ether acetate, ethylene glycol monobutyl ether acetate, diethylene glycol monomethyl ether acetate, diethylene glycol monoethyl ether acetate, diethylene glycol monobutyl ether acetate, propylene glycol monomethyl ether acetate, dipropylene glycol monomethyl ether acetate, and methoxybutyl acetate, glycol diesters such as ethylene glycol diacetate, diethylene glycol diacetate, propylene glycol diacetate, dipropylene glycol diacetate, propionate ethylene glycol acetate, butyrate ethylene glycol acetate, butyrate diethylene glycol acetate, propionate diethylene glycol acetate, butyrate diethylene glycol acetate, propionate propylene glycol acetate, butyrate propylene glycol acetate, butyrate dipropylene glycol acetate, and propionate dipropylene glycol acetate.

The glycol ethers may be monoethers or diethers of alkylene glycols, and alkyl ethers are preferable. Specific examples include alkylene glycol monoalkyl ethers such as ethylene glycol monomethyl ether, ethylene glycol monoethyl ether, ethylene glycol monoisopropyl ether, ethylene glycol monobutyl ether, diethylene glycol monomethyl ether, diethylene glycol monoethyl ether, diethylene glycol monobutyl ether, triethylene glycol monomethyl ether, triethylene glycol monoethyl ether, triethylene glycol monobutyl ether, tetraethylene glycol monomethyl ether, tetraethylene glycol monoethyl ether, tetraethylene glycol monobutyl ether, propylene glycol monomethyl ether, propylene glycol monoethyl ether, propylene glycol monopropyl ether, propylene glycol monobutyl ether, dipropylene glycol monomethyl ether, dipropylene glycol monoethyl ether, dipropylene glycol monopropyl ether, dipropylene glycol monobutyl ether, and tripropylene glycol monobutyl ether, alkylene glycol dialkyl ethers such as ethylene glycol dimethyl ether, ethylene glycol diethyl ether, ethylene glycol dibutyl ether, diethylene glycol dimethyl ether, diethylene glycol diethyl ether, diethylene glycol dibutyl ether, diethylene glycol methyl ethyl ether, diethylene glycol methyl butyl ether, triethylene glycol dimethyl ether, triethylene glycol diethyl ether, triethylene glycol dibutyl ether, triethylene glycol methyl butyl ether, tetraethylene glycol dimethyl ether, tetraethylene glycol diethyl ether, tetraethylene glycol dibutyl ether, propylene glycol dimethyl ether, propylene glycol diethyl ether, dipropylene glycol dimethyl ether, dipropylene glycol diethyl ether, and tripropylene glycol dimethyl ether. With the above, it is possible to control the wettability and the like of the resin liquid composition to the recording medium.

In addition, for the above glycol ethers, diethers tend to dissolve or swell the resin in the resin liquid composition more easily than monoethers and are more preferable in terms of improving the abrasion resistance of the formed image. On the other hand, monoethers have superior wettability and spreadability, which is preferable. In addition, the content of glycol ethers in the resin liquid composition is preferably 1% by mass or more and 30% by mass or less, more preferably 2% by mass or more and 20% by mass or less, and even more preferably 3% by mass or more and 10% by mass or less.

Examples of cyclic esters include cyclic esters (lactones) such as β-propiolactone, γ-butyrolactone, δ-valerolactone, ε-caprolactone, β-butyrolactone, γ-valerolactone, γ-valerolactone, β-hexanolactone, γ-hexanolactone, δ-hexanolactone, β-heptanolactone, γ-heptanolactone, δ-heptanolactone, ε-heptanolactone, γ-octanolactone, δ-octanolactone, ε-octanolactone, δ-nonalactone, ε-nonalactone, and ε-decanolactone, and compounds in which the hydrogen of the methylene group adjacent to the carbonyl group is substituted with an alkyl group with 1 to 4 carbon atoms.

The content of the organic solvent is preferably 1% by mass or more with respect to the total mass of the resin liquid composition, 3% by mass or more is preferable, 5% by mass or more is more preferable, 10% by mass or more is even more preferable, and 15% by mass or more is particularly preferable. In addition, the content of the organic solvent with respect to the total mass of the resin liquid composition is preferably 40% or less by mass, 35% by mass or less is more preferable, and 30% by mass or less is even more preferable. Furthermore, the content is more preferably 25% by mass or less, and 23% by mass or less is particularly preferable. When the content of the organic solvent is in this range, the clogging recovery property and abrasion resistance of the resin liquid composition are superior, which is preferable.

The standard boiling point of the organic solvent is preferably 160° C. or higher, more preferably 180° C. or higher, and even more preferably 200° C. or higher. In addition, the standard boiling point of the organic solvent is preferably 280° C. or lower, more preferably 270° C. or lower, and even more preferably 250° C. or lower. When the standard boiling point of the organic solvent is in this range, the clogging recovery property and abrasion resistance of the resin liquid composition are superior, which is preferable.

Polyol-based organic solvents with a standard boiling point of higher than 280° C., such as triethylene glycol and glycerin, function as moisturizing agents, thus, when contained, drying of the ink jet head is suppressed and the clogging recovery property is excellent. On the other hand, polyol-based organic solvents with a standard boiling point of higher than 280° C. may absorb moisture in the resin liquid composition, causing the resin liquid composition near the ink jet head to thicken or decreasing the drying property of the resin liquid composition when attached to the recording medium. For this reason, in the present embodiment, the resin liquid composition preferably does not contain more than 1.0% by mass of a polyol-based organic solvent with a standard boiling point higher than 280° C. with respect to the total mass of the resin liquid composition, more preferably does not contain more than 0.8% by mass, and particularly preferably does not contain more than 0.1% by mass. In such a case, the drying property of the resin liquid composition on the recording medium is increased, which is particularly suitable for recording on low-absorbent recording media, and it is possible to obtain images with excellent abrasion resistance. Furthermore, in terms of obtaining an image with excellent abrasion resistance, the content of not only polyols but also organic solvents having a standard boiling point of higher than 280° C. is more preferably in the range described above.

1.1.4. Surfactant

The water-based resin liquid composition forming the ink set according to the present embodiment may contain a surfactant. The surfactant is not particularly limited and examples thereof include an acetylene glycol-based surfactant, a fluorine-based surfactant, and a silicone-based surfactant and it is preferable to contain at least one of the above, and among these, it is more preferable to contain an acetylene glycol-based surfactant or a silicone-based surfactant. The resin liquid composition containing an acetylene glycol-based surfactant or a silicone-based surfactant tends to lower the dynamic surface tension of the resin liquid composition and makes it possible to improve the clogging recovery property.

The acetylene glycol-based surfactant is not particularly limited and examples thereof include Surfynol 104, 104E, 104H, 104A, 104BC, 104DPM, 104PA, 104PG-50, 104S, 420, 440, 465, 485, SE, SE-F, 504, 61, DF 37, CT 111, CT 121, CT 131, CT 136, TG, GA, and DF 110 D (the above are all product names, manufactured by Air Products Japan Inc.), Olfine B, Y, P, A, STG, SPC, E1004, E1010, PD-001, PD-002W, PD-003, PD-004, EXP. 4001, EXP. 4036, EXP. 4051, AF-103, AF-104, AK-02, SK-14, and AE-3 (the above are all product names, manufactured by Nissin Chemical Industry Co., Ltd.), Acetylenol E00, E00P, E40, and E100 (the above are all product names, manufactured by Kawaken Fine Chemicals Co., Ltd.).

Silicone-based surfactants are not particularly limited and preferable examples thereof include polysiloxane-based compounds. Polysiloxane-based compounds are not particularly limited and examples thereof include a polyether-modified organosiloxane. Examples of commercially available products of the polyether-modified organosiloxane include BYK-306, BYK-307, BYK-333, BYK-341, BYK-345, BYK-346, and BYK-348 (the above are product names, manufactured by BYK Japan), KF-351A, KF-352A, KF-353, KF-354L, KF-355A, KF-615A, KF-945, KF-640, KF-642, KF-643, KF-6020, X-22-4515, KF-6011, KF-6012, KF-6015, and KF-6017 (the above are product names, manufactured by Shin-Etsu Chemical Co., Ltd.), Silface SAG503A, Silface SAG014 (the above are product names, manufactured by Nissin Chemical Industry Co., Ltd.), and the like.

As a fluorine-based surfactant, it is preferable to use a fluorine-modified polymer and specific examples thereof include BYK-340 (product name, manufactured by BYK Japan).

When a surfactant is contained, the content thereof is preferably 0.1% by mass or more and 1.5% by mass or less with respect to the total mass of the resin liquid composition.

1.1.5. pH Adjusting Agent

In the present embodiment, the resin liquid composition preferably contains a pH adjusting agent for the purpose of adjusting the pH. The pH adjusting agent is not particularly limited and examples thereof include acids, bases, weak acids, weak bases, and appropriate combinations thereof, for example, tertiary alkanolamines such as triethanolamine and triisopropanolamine or the like. When a pH adjusting agent is added, for example, the total amount of the pH adjusting agent is preferably 0.01% by mass or more and 2% by mass or less with respect to the total amount of the resin liquid composition, more preferably 0.1% by mass or more and 1% by mass or less, and even more preferably 0.2% by mass or more and 0.5% by mass or less.

1.1.6. Chelating Agent

In the present embodiment, an appropriate amount of a chelating agent may be added to the resin liquid composition for the purpose of removing unwanted ions in the resin liquid composition. Examples of chelating agents include ethylenediaminetetraacetic acid and salts thereof such as ethylenediaminetetraacetic acid dihydrogen disodium salt, ethylenediamine nitrilotriacetate, ethylenediamine hexamethaphosphate, ethylenediamine pyrophosphate, and ethylenediamine metaphosphate, and the like. When a chelating agent is added, it is possible to set the amount to 0.01% by mass or more and 1% by mass or less with respect to the total amount of the resin liquid composition.

1.1.7. Preservatives and Antifungal Agents

In the present embodiment, a preservative and an antifungal agent may be added as appropriate to the resin liquid composition. Examples of preservatives and antifungal agents include sodium benzoate, sodium pentachlorophenol, sodium 2-pyridinethiol-1-oxide, sodium sorbate, sodium dehydroacetate, 1,2-dibenzoisothiazolin-3-one, such as Proxel CRL, BDN, GXL, XL-2, TN, and LV, which are sold by Lonza Japan, 4-chloro-3-methylphenol, such as Preventol (registered trademark) CMK, which is sold by Bayer Holding Ltd., and the like.

1.1.8. Other Components of Resin Liquid Composition

The resin liquid composition may further contain, as components other than the above, additives able to be normally used in ink jet inks, such as, for example, rust inhibitors such as benzotriazole, antioxidants, UV absorbers, oxygen absorbers, and dissolution aids.

The resin liquid composition is not a composition used for coloring a recording medium such as the ink composition described below. For this reason, the content of a coloring material such as a pigment in the resin liquid composition is preferably 0.2% by mass or less, more preferably 0.1% by mass or less, even more preferably 0.05% by mass or less, particularly preferably 0.01% by mass or less, and the content may be 0% by mass.

1.1.9. Method for Manufacturing Resin Liquid Composition

The method for manufacturing a water-based resin liquid composition forming the ink set according to the present embodiment is not particularly limited, but manufacturing is possible, for example, in the following manner. It is possible to carry out the manufacturing by mixing a dispersion of resin particles or a resin solution and the components of each of the resin liquid compositions described above in any order, and removing impurities as necessary by filtering or the like. As a method of mixing each component, a method of adding the materials sequentially to a container provided with a stirring apparatus such as a mechanical stirrer or magnetic stirrer and stirring and mixing is suitably used.

1.1.10. Physical Properties of Resin Liquid Composition

From the viewpoint of balance between image quality and reliability as an ink for ink jet recording, the water-based resin liquid composition forming the ink set according to the present embodiment preferably has a surface tension at 20° C. of 20 mN/m or more and 40 mN/m or less, and more preferably 20 mN/m or more and 35 mN/m or less. It is possible to measure the surface tension, for example, using an automatic surface tension meter CBVP-Z (product name, manufactured by Kyowa Interface Science Co., Ltd.) to confirm the surface tension when a platinum plate is wetted with the resin liquid composition in an environment of 20° C.

In addition, from the same point of view, the viscosity at 20° C. of the water-based resin liquid composition forming the ink set according to the present embodiment is preferably 1.5 mPa·s or more and 5.0 mPa·s or less, and more preferably 1.5 mPa·s or more and 3.6 mPa·s or less. It is possible to measure the viscosity, for example, using a viscoelasticity testing machine MCR-300 (product name, manufactured by Pysica) in an environment of 20° C.

1.2. Colored Ink Composition

The colored ink composition, which is a water-based ink jet ink forming the ink set according to the present embodiment, contains a pigment.

The colored ink composition includes a pigment and may include the same components as the resin liquid composition, except that it may not necessarily contain a urethane resin which has an alicyclic structure or aromatic ring structure and an acid value of 50-100 mg KOH/g, and the contents and the like thereof may be the same.

As pigments, it is possible to use both organic pigments and inorganic pigments. The pigments included in the colored ink composition are not limited and it is possible to use a pigment of any color of a white type white pigment or a non-white type non-white pigment (yellow, cyan, magenta, black, and the like).

In this manner, pigments of any color may be used in the colored ink composition and, accordingly, the colored ink composition forming the ink set according to the present embodiment may include a white ink containing a white pigment and a non-white ink containing a non-white pigment. According to the ink set according to the present embodiment, even when both the white ink and the non-white ink are provided in this manner, it is possible to achieve both excellent laminate peeling strength and blocking resistance of the recorded material and an excellent clogging recovery property.

On the other hand, as described above, when the pigment contained in the colored ink composition is a white pigment, the laminate peeling strength, blocking resistance, and clogging recovery property are particularly inferior. According to the ink set according to the present embodiment, the colored ink composition is more preferably a white ink containing a white pigment, from the viewpoint that even a white ink is able to achieve both excellent laminate peeling strength and blocking resistance and an excellent clogging recovery property and better obtain the effects of the disclosure.

A description will be given below of each of the components contained in the colored ink composition separately for the white ink and the non-white ink.

1.2.1. White Ink

A white ink contains a white pigment. A description will be given below of the components contained in the white ink.

1.2.1.1. White Pigment

In the present embodiment, examples of white pigments for white ink include C.I. Pigment White 1, which is basic lead carbonate, C.I. Pigment White 4, which is formed of zinc oxide, C.I. Pigment White 5, which is formed of a mixture of zinc sulfide and barium sulfate, C.I. Pigment White 6, which is formed of titanium dioxide, C.I. Pigment White 6:1, which is formed of titanium dioxide containing other metal oxides, C.I. Pigment White 7, which is formed of zinc sulfide, C.I. Pigment White 18 which is formed of calcium carbonate, C.I. Pigment White 19 which is formed of clay, C.I. Pigment White 20 which is formed of titanium mica, C.I. Pigment White 21, which is formed of barium sulfate, C.I. Pigment White 22, which is formed of plaster, C.I. Pigment White 26, which is formed of magnesium oxide and silicon dioxide, C.I. Pigment White 27, which is formed of silicon dioxide, C.I. Pigment White 28, which is formed of anhydrous calcium silicate, and the like. Among the above, C.I. Pigment White 6, which has excellent coloration, concealing properties, and the like, is preferable.

The average particle diameter of the white pigment is preferably 100 µm or more and 500 µm or less, more preferably 50 µm or more and 450 µm or less, and even more preferably 200 µm or more and 400 µm or less. Setting the average particle diameter of the white pigment in this range tends to make it possible to ensure the ejection stability from the ink jet head. In addition, it tends to make it possible to improve the concealing properties.

In the present specification, "average particle diameter" refers to the volume-based particle size distribution, which is the particle diameter at 50 vol % cumulative distribution, unless otherwise specified. The average particle diameter is measured by the dynamic light scattering method or the laser diffraction light method described in JIS 28825. Specifically, it is possible to use a particle size analyzer (for example, "Microtrac UPA" manufactured by Nikkiso Co., Ltd.) using the dynamic light scattering method as a measurement principle.

In the present specification, the term "white" when referring to a white ink, a white pigment, and the like does not refer only to perfect white, but also includes slightly colored colors with chromatic colors, achromatic colors, and glossy colors, within a range which is visible as white. For example, in CIELAB, colors with L* of 80 or more and a* and b* of ±10 or less, respectively, are preferable. Furthermore, colors with L* of 90 or more and a* and b* of ±50 or less, respectively, are preferable.

The content (solid content) of the white pigment in the white ink is 5% by mass or more and 20% by mass or less with respect to the total mass of the white ink, preferably 7% by mass or more and 20% by mass or less, and more preferably 9% by mass or more and 15% by mass or less, and even more preferably 12% by mass or more and 15% by mass or less. If the content of the white pigment is within the above ranges, nozzle clogging or the like of the ink jet recording apparatus is less likely to occur and it is possible to sufficiently satisfy the concealing properties such as the whiteness.

1.2.1.2. Dispersing Agent

The white pigment is suitably able to be stably dispersed in water and, for this purpose, a dispersing agent may be used to carry out the dispersion. The dispersing agent may be a surfactant, a resin dispersing agent, or the like and is selected from dispersing agents which provide good dispersion stability of the white pigment in the white ink. In addition, the white pigment may also be used as a self-dispersing pigment by modifying the surface of the pigment particles by oxidizing or sulfonating the pigment surface with, for example, ozone, hypochlorous acid, fuming sulfuric acid, or the like.

As resin dispersing agents, (meth)acrylic-based resins and salts thereof such as poly(meth)acrylic acid, (meth)acrylic acid-acrylonitrile copolymers, (meth)acrylic acid-(meth) acrylic acid ester copolymers, vinyl acetate-(meth)acrylic acid ester copolymers, vinyl acetate-(meth)acrylic acid copolymers, and vinyl naphthalene-(meth)acrylic acid copolymers; styrene-based resins and salts thereof such as styrene-(meth)acrylic acid copolymers, styrene-(meth)acrylic acid-(meth)acrylic acid ester copolymers, styrene-α-methylstyrene-(meth)acrylic acid copolymers, styrene-α-methylstyrene-(meth)acrylic acid-(meth)acrylic acid ester copolymers, styrene-maleic acid copolymers, and styrene-maleic acid anhydride copolymers; urethane-based resins and salts thereof, with or without a cross-linked structure, which are polymer compounds (resins) including urethane bonds reacted with isocyanate groups and hydroxyl groups, and which may be linear and/or branched; polyvinyl alcohols; vinyl naphthalene-maleic acid copolymers and salts thereof; vinyl acetate-maleic acid ester copolymers and salts thereof; and water-soluble resins such as vinyl acetate-crotonic acid copolymers and salts thereof. Among these, copolymers of monomers having hydrophobic functional groups and monomers with hydrophilic functional groups, and polymers formed of monomers having both hydrophobic functional groups and hydrophilic functional groups are preferable. As the form of the copolymers, it is possible to use any of random copolymers, block copolymers, alternating copolymers, and graft copolymers.

Examples of commercially available products of styrene-based resin dispersing agents include X-200, X-1, X-205, X-220, and X-228 (manufactured by Seiko PMC Corporation), Nopco Sparse (registered trademark) 6100 and 6110 (manufactured by San Nopco Ltd.), Joncryl 67, 586, 611, 678, 680, 682, and 819 (manufactured by BASF), DISPERBYK-190 (manufactured by BYK Japan), N-EA137, N-EA157, N-EA167, N-EA177, N-EA197D, N-EA207D, and E-EN10 (manufactured by DKS Co., Ltd.), and the like.

In addition, examples of commercially available products of acrylic-based resin dispersing agents include BYK-187, BYK-190, BYK-191, BYK-194N, and BYK-199 (manufactured by BYK Japan), Aron A-210, A6114, AS-1100, AS-1800, A-30SL, A-7250, and CL-2 (manufactured by Toagosei Co., Ltd.), and the like.

Furthermore, examples of commercially available products of urethane-based resin dispersing agents include BYK-182, BYK-183, BYK-184, BYK-185 (manufactured by BYK Japan), TEGO Disperse 710 (manufactured by Evonik Tego Chemi), Borchi (registered trademark) Gen 1350 (manufactured by OMG Borchers), and the like.

One dispersing agent may be used as one alone, or two or more may be used in combination. The total content of the dispersing agent is preferably 0.1 part by mass or more and 30 parts by mass or less with respect to 60 parts by mass of white pigment, more preferably 0.5 parts by mass or more and 25 parts by mass or less, even more preferably 1 part by mass or more and 20 parts by mass or less, and yet more preferably 1.5 parts by mass or more and 15 parts by mass or less. The content of the dispersing agent being in the above ranges or more makes it possible to further increase the dispersion stability of the white pigment. In addition, when the content of the dispersing agent is in the above ranges or less, it is possible to keep the viscosity of the obtained dispersion low.

Among the dispersing agents illustrated above, the dispersing agent is more preferably a resin dispersing agent, in particular, at least one selected from an acrylic-based resin, a styrene-based resin, and a urethane-based resin. In addition, in such a case, it is also preferable that the weight average molecular weight of the dispersing agent is 500 or more. By using such a resin dispersing agent as a dispersing agent, the odor is reduced and it is possible to further improve the dispersion stability of the white pigment.

1.2.1.3. Water

The white ink contains water. The water is the same as in the resin liquid composition and will not be described again.

1.2.1.4. Resin

The white ink may contain a resin other than the urethane resin contained in the resin liquid composition described above. The white ink containing the resin makes it possible to improve the adhesion of the image due to the white ink being attached to the recording medium and may improve the blocking resistance.

Examples of resins other than urethane resins contained in the resin liquid compositions described above include resins formed of urethane-based resins, acrylic-based resins, fluorene-based resins, polyolefin-based resins, rosin-modified resins, terpene-based resins, polyester-based resins, polyamide-based resins, epoxy-based resins, vinyl chloride-based resins, vinyl chloride-vinyl acetate copolymers, ethylene-vinyl acetate-based resins, and the like. These resins are often handled in emulsion form, but may be in powder form. In addition, it is possible to use the resins as one alone or in a combination of two or more.

Urethane-based resin is a generic term for resins having urethane bonds. For urethane-based resins, in addition to urethane bonds, polyether-type urethane resins including ether bonds in the main chain, polyester-type urethane resins including ester bonds in the main chain, and polycarbonate-type urethane resins including carbonate bonds in the main chain, and the like may be used. As urethane-based resins, commercially available products may be used, for example, commercially available products selected from Superflex 460, 460s, 840, and E-4000 (product names, manufactured by DKS Co., Ltd.), Resamine D-1060, D-2020, D-4080, D-4200, D-6300, and D-6455 (product names, manufactured by Dainichiseika Color & Chemicals Mfg Co., Ltd.), Takelac WS-6021 and W-512-A-6 (product names, manufactured by Mitsui Chemicals & SKC Polyurethanes Inc.), Sancure 2710 (product name, manufactured by Lubrizol), Permalin UA-150 (product name, manufactured by Sanyo Chemical, Ltd.), and the like may be used.

Acrylic-based resin is a general term for a polymer obtained by polymerizing at least an acrylic-based monomer such as (meth)acrylic acid and (meth)acrylic acid ester as one component and examples thereof include resins obtained from acrylic-based monomers, copolymers of acrylic-based monomers and other monomers, and the like. Examples thereof include acrylic-vinyl-based resins, which are copolymers of acrylic-based monomers and vinyl-based monomers, and the like. Furthermore, examples thereof include copolymers with vinyl-based monomers such as styrene.

It is also possible to use acrylamide, acrylonitrile, and the like as acrylic-based monomers. For resin emulsions in which the raw material is an acrylic-based resin, commercially available products may be used, for example, products selected from FK-854 (product name, manufactured by Chirika Co., Ltd.), Mowinyl 952B and 718A (product names, manufactured by The Nippon Synthetic Chemical Industry Co., Ltd.), Nipol LX852 and LX874 (product names, manufactured by Zeon Corporation), and the like may be used.

In the present specification, the acrylic-based resin may be a styrene acrylic-based resin. In addition, in the present specification, the term (meth)acrylic means at least one of acrylic and methacrylic.

Styrene acrylic-based resins are copolymers obtained from styrene monomers and acrylic-based monomers and examples thereof include styrene-acrylic acid copolymers, styrene-methacrylic acid copolymers, styrene-methacrylic acid-acrylic acid ester copolymers, styrene-α-methylstyrene-acrylic acid copolymers, styrene-α-methylstyreneacrylic acid-acrylic acid ester copolymers, and the like. For styrene-acrylic-based resins, commercially available products may be used, for example, products selected from Joncryl 62J, 7100, 390, 711, 511, 7001, 632, 741, 450, 840, 74J, HRC-1645J, 734, 852, 7600, 775, 537J, 1535, PDX-7630A, 352J, 352D, PDX-7145, 538J, 7640, 7641, 631, 790, 780, and 7610 (product names, manufactured by BASF), Mowinyl 966A and 975N (product names, manufactured by Nippon Synthetic Chemical Industry Co., Ltd.), Vinibran 2586 (product name, manufactured by Nissin Chemical Industry Co., Ltd.), and the like may be used.

Polyolefin-based resins have olefins such as ethylene, propylene, butylene, and the like in the structural skeleton thereof and it is possible to appropriately select and use known resins. As the olefin resin, it is possible to use commercially available products, for example, products selected from Arrow Base CB-1200 and CD-1200 (product names, manufactured by Unitika Ltd.), and the like may be used.

Among these resins, the white ink preferably contains an acrylic-based resin. The white ink containing an acrylic-based resin tends to make it possible to further improve the adhesion of the image due to the ink attached to the recording medium and tends to further improve the blocking resistance.

In addition, the resin may be supplied in the form of an emulsion and, as examples of commercially available resin emulsions, Microgel E-1002 and E-5002 (product names, manufactured by Nippon Paint, styrene-acrylic-based resin emulsions), Voncoat 4001 (product name, manufactured by DIC Corporation, acrylic-based resin emulsion), Voncoat 5454 (product name, manufactured by DIC Corporation, styrene-acrylic-based resin emulsion), Polysol AM-710, AM-920, AM-2300, AP-4735, AT-860, and PSASE-4210E (acrylic-based resin emulsions), Polysol AP-7020 (styrene-acrylic resin emulsion), Polysol SH-502 (vinyl acetate resin emulsion), Polysol AD-13, AD-2, AD-10, AD-96, AD-17, and AD-70 (ethylene vinyl acetate resin emulsions), Polysol PSASE-6010 (ethylene vinyl acetate resin emulsion) (product name, manufactured by Showa Denko K.K.), Polysol SAE1014 (product name, manufactured by Zeon Corporation, styrene-acrylic-based resin emulsion), Cybinol SK-200 (product name, manufactured by Saiden Chemical Industry Co., Ltd., acrylic-based resin emulsion), AE-120A (product name, manufactured by JSR Corporation, acrylic resin emulsion), AE373D (product name, manufactured by Emulsion Technology Co., Ltd., carboxy-modified styrene-acrylic resin emulsion), Seikadyne 1900W (product name, manufactured by Dainichiseika Color & Chemicals Mfg Co., Ltd., ethylene vinyl acetate resin emulsion), VINYBLAN 2682 (acrylic resin emulsion), VINYBLAN 2886 (vinyl acetate-acrylic resin emulsion), VINYBLAN 5202 (acetic acid-acrylic resin emulsion) (product name, manufactured by Nissin Chemical Industry Co., Ltd.), Elitel KA-5071S, KT-8803, KT-9204, KT-8701, KT-8904, and KT-0507 (product names, manufactured by Unitika, polyester resin emulsions), Hitec SN-2002 (product name, manufactured by TOHO Chemical Industry Co., Ltd., polyester resin emulsion), Takelac W-6020, W-635, W-6061, W-605, W-635, and W-6021 (product names, manufactured by Mitsui Chemicals Polyurethanes, urethane-based resin emulsions), Superflex 870, 800, 150, 420, 460, 470, 610, and 700 (product names, manufactured by DKS Co., Ltd, urethane-based resin emulsions), Permalin UA-150 (manufactured by Sanyo Chemical, Ltd., urethane-based resin emulsion), Suncure 2710 (manufactured by Lubrizol Japan, urethane-based resin emulsion), NeoRez R-9660, R-9637, and R-940 (manufactured by Kusumoto Chemicals, Ltd., urethane-based resin emulsions), ADEKA Bontighter HUX-380 and 290K (manufactured by ADEKA CORPORATION, urethane-based resin emulsions), Mowinyl 966A and Mowinyl 7320 (manufactured by Nippon Synthetic Industry Chemical Co., Ltd.), Joncryl 7100, 390, 711, 511, 7001, 632, 741, 450, 840, 74J, HRC-1645J, 734, 852, 7600, 775, 537J, 1535, PDX-7630A, 352J, 352D, PDX-7145, 538J, 7640, 7641, 631, 790, 780, and 7610 (the above are manufactured by BASF), NK Binder R-5HN (manufactured by Shinnakamura Chemical Industry Co., Ltd.), Hydran WLS-210 (manufactured by DIC Corporation, non-cross-linkable polyurethane), Joncryl 7610 (manufactured by BASF), and the like may be selected for use from among the above.

The glass transition temperature (Tg) of the resin is preferably −50.0° C. or higher and 200.0° C. or lower, more preferably 0.0° C. or higher and 150.0° C. or lower, and even more preferably 50.0° C. or higher and 100.0° C. or lower. The glass transition temperature (Tg) of the resin being within the range described above tends to make the durability and clogging resistance superior. The measurement of the glass transition temperature is performed, for example, using a differential scanning calorimeter "DSC7000" manufactured by Hitachi High-Tech Science Corporation, in accordance with JIS K7121 (method for measuring transition temperature of plastics).

In addition, it is possible to regulate the Tg of the resin during resin polymerization by adjusting the type and composition ratio of the monomers, focusing on the individual Tg of each monomer to be used. Due to this, it is possible to adjust the Tg of the entire resin. In addition, it is also possible to adjust the acid value of the resin mainly by adjusting the type and composition ratio of the monomers and, due to this, it is possible to adjust the adhesion between the resin and the recording medium. It is possible to adjust the aggregation of the white ink in consideration of the aggregation of each substance such as resin, white pigment, and pigment dispersing agent and the mutually correlated aggregation thereof.

When the resin is contained in the white ink, the content thereof is 0.1% by mass or more and 20.0% by mass or less as a solid content with respect to the total mass of the white ink, preferably 1.0% by mass or more and 15.0% by mass or less, and more preferably 2.0% by mass or more and 10.0% by mass or less.

1.2.1.5. Other Components of White Ink

The white ink may contain components, for example, other additives, such as organic solvents, surfactants, pH adjusting agents, chelating agents, preservatives and antifungal agents, rust inhibitors, antioxidants, UV absorbers, oxygen absorbers, and dissolution aids. These components are the same as in the resin liquid composition and are not described.

1.2.1.6. Manufacturing Method and Physical Properties of White Ink

The method for manufacturing a white ink is the same as that of the resin liquid composition and will not be described again.

From the viewpoint of further improving the clogging recovery property, the viscosity of the white ink is preferably 1.5 mPa·s or more and 15.0 mPa·s or less at 20° C., more preferably 1.5 mPa·s or more and 5.0 mPa·s or less, and even more preferably 1.5 mPa·s or more and 3.6 mPa·s or less.

The surface tension of the white ink at 25.0° C. is preferably 40.0 mN/m or less, preferably 38.0 mN/m or less, more preferably 35.0 mN/m or less, and even more preferably 30.0 mN/m or less. It is possible to measure the surface tension using an automatic surface tension meter CBVP-Z (manufactured by Kyowa Interface Science Co., Ltd.) to confirm the surface tension when a platinum plate is wetted with the composition in an environment of 25.0° C.

1.2.2. Non-White Ink

A non-white ink contains a non-white pigment. A description will be given below of the components contained in the non-white ink.

1.2.2.1. Non-White Pigment

The non-white pigments contained in the non-white ink refer to pigments other than the white pigments described above. The non-white pigments are preferably color pigments such as cyan, yellow, magenta, and black, for example. The pigments are preferably excellent in storage stability, such as light resistance, weather resistance, and gas resistance, and, from this viewpoint, organic pigments are preferable.

Specifically, as pigments, it is possible to use azo pigments such as insoluble azo pigments, condensed azo pigments, azo lakes, and chelated azo pigments, polycyclic pigments such as phthalocyanine pigments, perylene and perinone pigments, anthraquinone pigments, quinacridone pigments, dioxane pigments, thioindigo pigments, isoindolinone pigments, and quinophthalone pigments, dye chelates, dye lakes, nitro pigments, nitroso pigments, aniline black, daylight fluorescent pigments, carbon black, and the like. It is also possible to use the pigments described above as one alone or in a combination of two or more. Furthermore, photoluminescent pigments may be used as non-white pigments.

Specific examples of the pigments are not particularly limited, but examples thereof include the following.

Examples of black pigments include carbon blacks such as No. 2300, No. 900, MCF88, No. 33, No. 40, No. 45, No. 52, MA7, MA8, MA100, No. 2200B, and the like (the above are manufactured by Mitsubishi Chemical Corporation), Raven 5750, Raven 5250, Raven 5000, Raven 3500, Raven 1255, Raven 700, and the like (the above are manufactured by Carbon Columbia), Regal 400R, Regal 330R, Regal 660R, Mogul L, Monarch 700, Monarch 800, Monarch 880, Monarch 900, Monarch 1000, Monarch 1100, Monarch 1300, Monarch 1400, and the like (manufactured by Cabot Japan K.K.), and Color Black FW 1, Color Black FW2, Color Black FW2V, Color Black FW18, Color Black FW200, Color Black 5150, Color Black 5160, Color Black 5170, Printex 35, Printex U, Printex V, Printex 140U, Special Black 6, Special Black 5, Special Black 4A, and Special Black 4 (the above are manufactured by Degussa).

Examples of yellow pigments include C.I. Pigment Yellow 1, 2, 3, 4, 5, 6, 7, 10, 11, 12, 13, 14, 16, 17, 24, 34, 35, 37, 53, 55, 65, 73, 74, 75, 81, 83, 93, 94, 95, 97, 98, 99, 108, 109, 110, 113, 114, 117, 120, 124, 128, 129, 133, 138, 139, 147, 151, 153, 154, 167, 172, and 180.

Examples of magenta pigments include C.I. Pigment Red 1, 2, 3, 4, 5, 6, 7, 8, 9, 10, 11, 12, 14, 15, 16, 17, 18, 19, 21, 22, 23, 30, 31, 32, 37, 38, 40, 41, 42, 48 (Ca), 48 (Mn), 57 (Ca), 57:1, 88, 112, 114, 122, 123, 144, 146, 149, 150, 166, 168, 170, 171, 175, 176, 177, 178, 179, 184, 185, 187, 202, 209, 219, 224, 245, or C.I. Pigment Violet 19, 23, 32, 33, 36, 38, 43, and 50.

Examples of cyan pigments include C.I. Pigment Blue 1, 2, 3, 15, 15:1, 15:2, 15:3, 15:34, 15:4, 16, 18, 22, 25, 60, 65, 66, C.I. Vat Blue 4, and 60.

In addition, pigments other than magenta, cyan, and yellow are not particularly limited and examples thereof include C.I. Pigment Green 7, 10, C.I. Pigment Brown 3, 5, 25, 26, C.I. Pigment Orange 1, 2, 5, 7, 13, 14, 15, 16, 24, 34, 36, 38, 40, 43, and 63.

Pearl pigments are not particularly limited and examples thereof include pigments having pearl luster or interference luster such as titanium dioxide coated mica, fish scale foil, and bismuth acid chloride.

Metallic pigments are not particularly limited and examples thereof include particles formed of aluminum, silver, gold, platinum, nickel, chromium, tin, zinc, indium, titanium, copper, and the like, alone or in alloys.

Being able to stably disperse or dissolve the non-white pigment in water is suitable and the dispersion may be carried out using a dispersing agent as necessary. As dispersing agents, examples include the same dispersing agents as used to improve the dispersibility of the white pigments in the white ink described above.

The content of the non-white pigment is preferably 0.3% by mass or more and 20.0% by mass or less with respect to the total mass of the non-white ink, more preferably 0.5% by mass or more and 15.0% by mass or less, even more preferably 1% by mass or more and 10% by mass or less, and particularly preferably 2% by mass or more and 5% by mass or less. For the aggregation of the non-white pigment included in the non-white ink, both high aggregation pigments and low aggregation pigments are able to be used; however, the aggregation of the non-white pigment is preferably high in terms of having a superior blotting resistance and the like.

The average particle diameter of the pigment particles of the non-white pigment is preferably 10.0 nm or more and 200.0 nm or less, more preferably 30.0 nm or more and 200.0 nm or less, even more preferably 50.0 nm or more and 150.0 nm or less, and particularly preferably 70.0 nm or more and 120.0 nm or less. When the average particle diameter is in the range described above, it is easy to obtain the desired pigment and to make the pigment characteristics and the like preferable, which is preferable.

1.2.2.2. Resin

The non-white ink may contain a resin other than the urethane resin contained in the resin liquid composition described above. The non-white ink containing a resin other than the urethane resin contained in the resin liquid composition makes it possible to improve the adhesion of the image due to the ink attached to the recording medium and the blocking resistance may be improved. In addition, the non-white ink may also contain a urethane resin contained in the resin liquid composition described above.

The resins other than the urethane resin contained in the resin liquid composition are the same as described above and are not described.

1.2.2.3. Other Components of Non-White Ink

In addition to the non-white pigment, the non-white ink contains water and may contain components, for example, other additives, such as organic solvents, surfactants, pH adjusting agents, chelating agents, preservatives and antifungal agents, rust inhibitors, antioxidants, UV absorbers, oxygen absorbers, and dissolution aids. These components are the same as in the resin liquid composition and are not described.

1.2.2.4. Method for Manufacturing Non-White Ink and Physical Properties

The method for manufacturing a non-white ink is the same as that of the resin liquid composition and will not be described again.

From the viewpoint of further improving the clogging recovery property, the viscosity of the non-white ink is preferably 1.5 mPa·s or more and 15.0 mPa·s or less at 20° C., more preferably 1.5 mPa·s or more and 5.0 mPa·s or less, and even more preferably 1.5 mPa·s or more and 3.6 mPa·s or less.

From the viewpoint of making the wettability and spreadability to the recording medium appropriate, the surface tension of the non-white ink at 25.0° C. is preferably 40.0 mN/m or less, preferably 38.0 mN/m or less, more preferably 35.0 mN/m or less, and even more preferably 30.0 mN/m or less. The measurement of the surface tension is performed in the same manner as for white ink.

1.3. Recorded Material Using Ink Set

According to the recording method described below, it is possible to suitably use the ink set according to the present embodiment for recording on a recording medium.

The recording medium is not particularly limited and it is possible to use an absorbent recording medium, a low-absorbent recording medium, or a non-absorbent recording medium. Examples of absorbent recording media include absorbent paper, cloth, and the like.

Among these, a low-absorbent recording medium or a non-absorbent recording medium is preferable. According to the ink set according to the present embodiment, it tends to be possible to obtain a recorded material having excellent laminate peeling strength and blocking resistance, even with respect to such low-absorbent recording media or non-absorbent recording media.

In the disclosure, a low-absorbent recording medium or a non-absorbent recording medium refers to a recording medium which has a property of not absorbing, or hardly absorbing, the resin liquid composition and the colored ink composition (both may be collectively referred to as "ink" below). Quantitatively, the recording medium used in the present embodiment refers to "a recording medium in which the amount of water absorbed from the start of contact to 30 msec$^{1/2}$ in the Bristow method is 10 mL/m$^2$ or less". The Bristow method is the most widespread method as a method for measuring an amount of liquid absorbed in a short time and is also used by the Japan Technical Association of the Pulp and Paper Industry (Japan TAPPI). The details of the test method are described in Standard No. 51 "Paper and Paperboard—Liquid Absorption Test Method—Bristow Method" of "JAPAN TAPPI Paper and Pulp Test Methods 2000". Recording media having such non-absorbent properties include recording media not provided with an ink-receiving layer on the recording surface having an ink absorption property and recording media provided with a coating layer on the recording surface having a low ink absorption property.

Non-absorbent recording media are not particularly limited and examples thereof include a plastic film which does not have an ink-absorbing layer, media in which plastic is coated on, or in which a plastic film is bonded on, a base material such as paper, and the like. Here, examples of the above plastics include polyvinyl chloride, polyethylene terephthalate, polycarbonate, polystyrene, polyurethane, polyethylene, polypropylene, and the like.

Low-absorbent recording media are not particularly limited and examples thereof include coated paper having a coating layer for receiving ink on the surface thereof. Coated paper is not particularly limited and examples thereof include printing paper such as art paper, coated paper, and matte paper.

Among the above recording media, non-absorbent recording media having polyolefins (polyethylene, polypropylene, and the like) and polyethylene terephthalate (PET) as main components tend to be inferior in abrasion resistance and laminate peeling strength. In particular, non-absorbent recording media having polyolefins as a main component show such tendency. According to the ink set according to the present embodiment, it is possible to obtain a recorded material having excellent laminate peeling strength and blocking resistance even with respect to such a recording medium and, from the viewpoint of being better able to obtain the effect of the disclosure, it is preferable to use these recording media.

In addition, with the ink set according to the present embodiment, using a recorded material recorded using the ink set with a sealant film treatment applied to a recording surface is preferable from the viewpoint of being better able to obtain the effect of the disclosure.

In the disclosure, "sealant film treatment" refers to a treatment in which, after an image is formed on a recording medium, a sheet is adhered to at least a portion of the recording medium on which the image is formed. The sheet used in the sealant film treatment may be referred to in the present specification as a "sheet for laminating" or simply as a "sheet". The sheet has, for example, a base material and an adhesion layer. In addition to the base material and the adhesion layer, the sheet may have layers which perform other functions. In addition, the sheet for laminating may be provided on both surfaces of the recording medium and accordingly it is possible to further improve the effect of protecting the recording medium and the image.

Generally, when the sheet is for thermal lamination, the adhesion layer (may be referred to as a glue layer, sealant layer, and the like) is formed of a thermoplastic resin and the thermoplastic resin is softened or melted by heating to become glue-like and then pressed onto an adherend. Examples of thermoplastic resins include polyolefin-based resins such as polypropylene, low-density polyethylene (LDPE), linear low-density polyethylene, ethylene-vinyl acetate copolymer (EVA), ethylene-(meth)acrylic acid copolymer, ethylene-(meth)acrylic acid ester copolymer, ionomer resin (10), ethylene-α-olefin copolymer and amorphous polyester, polyester-based resins, modified products thereof, and the like. It is possible to set the thickness of the adhesion layer to, for example, 15 μm or more and 100 μm or less. The thermoplastic resin may be coated on the recording surface of the recorded material.

In addition, as the sheet for laminating, commercially available products may be used, for example, it is possible to carry out the manufacturing by forming the base material and the adhesion layer using commonly used methods such as tandem extrusion lamination, sandwich extrusion lamination, and dry lamination. The processing temperature in this case is preferably 150° C. to 300° C., and more preferably 200° C. to 280° C. In addition, in such processing, for example, an operation such as carrying out an ozone treatment or the like between the base material and the adhesion layer may be added.

2. RECORDING METHOD

The recording method according to one embodiment of the disclosure includes a colored ink composition attaching step in which the colored ink composition is attached to the recording medium by an ink jet method, and a resin liquid composition attaching step in which the resin liquid composition is attached to the recording medium.

The recording method according to the present embodiment is a method for recording an image on a recording medium by ejecting a colored ink composition and a resin liquid composition forming an ink set according to one embodiment of the disclosure described above from a recording head of an ink jet system. According to this recording method, it is possible to achieve both an excellent nozzle clogging recovery property and excellent laminate peeling strength and blocking resistance of the recorded material.

A description will be given below of an example of the recording method according to the present embodiment in the order of the ink jet recording apparatus, the ink jet recording method, and each step of the recording method.

2.1. Ink Jet Recording Apparatus

A description will be given of an example of an ink jet recording apparatus with which the recording method according to the present embodiment is carried out, with reference to the drawings.

Figure 2:
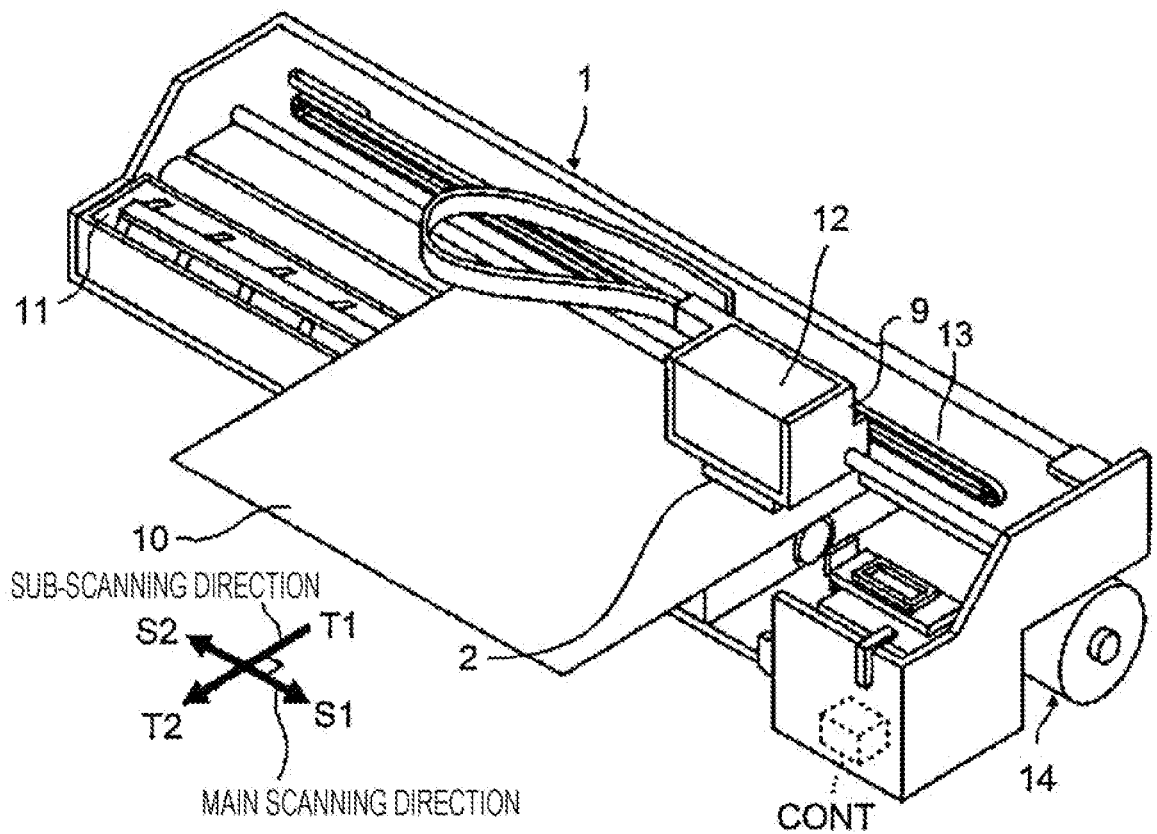
FIG. 2 is a perspective view showing an example of a configuration around a carriage of the ink jet recording apparatus.

FIG. 1 is a schematic sectional view showing the configuration of an ink jet recording apparatus. FIG. 2 is a perspective view showing an example of a configuration around a carriage of the ink jet recording apparatus. As shown in FIG. 1 and FIG. 2, an ink jet recording apparatus 1 includes an ink jet head 2, an IR heater 3, a platen heater 4, a heating heater 5, a cooling fan 6, a pre-heater 7, a ventilation fan 8, a carriage 9, a platen 11, a carriage movement mechanism 13, a motor 14 as a transport unit, and a control unit CONT. In the ink jet recording apparatus 1, the entire operation of the ink jet recording apparatus 1 is controlled by the control unit CONT shown in FIG. 2.

The ink jet head 2 is a unit for performing recording on a recording medium 10 by ejecting ink from the nozzles (refer to FIG. 3) to be attached thereto. In the present embodiment, the ink ejected from the nozzles of the ink jet head 2 refers collectively to the resin liquid composition and colored ink composition described above (also collectively referred to below as "ink"). The ink jet head 2 may be either a line-type ink jet head (also referred to below as a "line head") or a serial-type ink jet head (referred to below as a "serial head"). In the case of a line head, the head is fixed and the recording medium 10 is moved along the sub-scanning direction (T1-T2 direction in FIG. 2) and ink droplets are ejected from the nozzles of the line head in conjunction with this movement to make it possible to record an image on the recording medium. In addition, in the case of a serial head, it is possible to record an image on the recording medium 10 by moving the serial head along the main scanning direction (S1-S2 direction in FIG. 2) and ejecting ink droplets from the nozzles of the serial head in conjunction with this movement. This is referred to as a main scan, or simply scanning, or a pass. In the present embodiment shown in the diagram, a serial head is used as the ink jet head 2. The ink jet head 2 is mounted on the carriage 9 shown in FIG. 2. The ink jet head 2 is scanned a plurality of times in the main scanning direction relative to the recording medium 10 by the operation of the carriage movement mechanism 13 which moves the carriage 9 in the main scanning direction of the recording medium 10.

Here, the main scanning direction (also referred to below as "MS") is the direction in which the carriage 9 on which the ink jet head 2 is mounted moves. In FIG. 1, the main scanning direction is the direction which intersects the sub-scanning direction (also referred to below as "SS"), which is the transport direction of the recording medium 10 shown by the arrow X. In FIG. 2, the width direction of the recording medium 10, that is, the direction S1-S2, is the main scanning direction, and the direction T1-T2 is the sub-scanning direction. In one scan, scanning is performed in the main scanning direction, that is, in one direction of either the left or right direction of the ink jet recording apparatus 1. Then, by alternately repeating the main scanning of the ink jet head 2 and the sub-scanning, which is the transporting of the recording medium 10, recording is carried out with respect to the recording medium 10. The transporting of the recording medium 10 in the sub-scanning direction is also referred to as sub-scanning.

It is possible to use a method known in the related art as the ink ejection method in the ink jet head 2. For example, it is possible to use a method in which ink is ejected using a change in the volume of an ink storage portion due to mechanical deformation of a piezoelectric element, a method in which bubbles are generated in the ink and the ink is ejected using an electrothermal conversion element such as a heating resistor, or the like. In the present embodiment, a method in which ink is ejected due to mechanical deformation of a piezoelectric element is used. A description will be given below of the details of the configuration around the ink jet head 2 and the carriage 9.

The ink jet recording apparatus 1 includes the IR heater 3 and the platen heater 4 for heating the recording medium 10 during the ejection of ink from the ink jet head 2, that is, for primary heating. In the present embodiment, at least one of the IR heater 3 or the platen heater 4 may be used when heating the recording medium 10 in the resin liquid composition attaching step and the colored ink composition attaching step.

When the IR heater 3 is used, it is possible to heat the recording medium 10 from the ink jet head 2 side. Due to this, although the ink jet head 2 is also easily heated at the same time, it is possible to increase the temperature of the recording medium 10 without being affected by the thickness thereof, in comparison with a case of heating the recording medium 10 from the back surface, such as with the platen heater 4. In addition, when the platen heater 4 is used when heating the recording medium 10, it is possible to heat the recording medium 10 from the opposite side of the ink jet head 2 side. Due to this, it is comparatively difficult to heat the ink jet head 2. The surface temperature of the recording medium 10 when heated using the IR heater 3 or the platen heater 4 is also referred to as the primary heating temperature.

The upper limit of the surface temperature of the recording medium 10 according to the IR heater 3 or the platen heater 4 is preferably 50° C. or lower, more preferably 45° C. or lower, even more preferably 40° C. or lower, and particularly preferably 38° C. or lower. In addition, the lower limit of the surface temperature of the recording medium 10 is preferably 25° C. or higher, more preferably 28° C. or higher, even more preferably 30° C. or higher, and particularly preferably 32° C. or higher. Furthermore, 35° C. or higher is preferable, and 40° C. or higher is more preferable.

Due to this, radiation heat received from the IR heater 3 and the platen heater 4 is reduced or eliminated, thus, it is possible to suppress drying and compositional variation of the ink in the ink jet head 2 and welding of the ink and resin to the inner wall of the ink jet head 2 is suppressed. In addition, it is possible to fix the ink at an early stage and to improve the image quality.

The heating heater 5 dries and solidifies the ink attached to the recording medium 10, that is, the heating heater 5 is a heater for secondary heating. The heating heater 5 heating the recording medium 10 on which an image was recorded evaporates and scatters the moisture and the like included in the ink more rapidly to form an ink film with the resin included in the ink. In this manner, the ink film is firmly fixed or bonded on the recording medium 10 such that the film-forming properties are excellent and images with high image quality and high abrasion resistance are obtained in a short time. The upper limit of the surface temperature of the recording medium 10 according to the heating heater 5 is preferably 120° C. or lower, more preferably 100° C. or lower, and even more preferably 90° C. or lower. In addition, the lower limit of the surface temperature of the recording medium 10 is preferably 60° C. or higher, more preferably 70° C. or higher, and even more preferably 80° C. or higher. By having the temperature in the above ranges, high quality images are obtained in a short time. The surface temperature of the recording medium 10 when heated using the heating heater 5 is also referred to as the secondary heating temperature.

The ink jet recording apparatus 1 may have the cooling fan 6. By cooling the ink on the recording medium 10 by the cooling fan 6 after drying the ink recorded on the recording medium 10, it is possible to form an ink coating film on the recording medium 10 with good adhesion.

In addition, the ink jet recording apparatus 1 may include the pre-heater 7 which pre-heats the recording medium 10 before the ink is attached to the recording medium 10. Furthermore, the ink jet recording apparatus 1 may include the ventilation fan 8 in order to dry the ink attached to the recording medium 10 more efficiently.

Below the carriage 9, the platen 11 on which the recording medium 10 is transported, the carriage movement mechanism 13 which moves the carriage 9 relative to the recording medium 10, a roller which transports the recording medium 10 in the sub-scanning direction, and the motor 14 as a transport unit which drives the roller are provided. The operation of the carriage movement mechanism 13 and the motor 14 is controlled by the control unit CONT.

In the present embodiment, the ink jet head 2 ejects ink onto the recording medium 10 to be attached while moving according to the movement of the carriage 9. In this manner, in the present embodiment, recording is carried out by scanning the ink jet head 2 a plurality of times in the main scanning direction relative to the recording medium 10.

In the present embodiment, the cartridge 12 which supplies ink to the ink jet head 2 is formed of a plurality of independent cartridges. The cartridges 12 are attachable and detachable with respect to the carriage 9 on which the ink jet head 2 is mounted. Each of the plurality of the cartridges 12 is filled with a different type of ink and ink is supplied to each nozzle from the cartridges 12. In the present embodiment, an example is shown in which the cartridges 12 are mounted on the carriage 9; however, without being limited thereto, the cartridges 12 may be provided in a place other than the carriage 9 and in a form in which each nozzle is supplied by a supply pipe (not shown).

Figure 3:
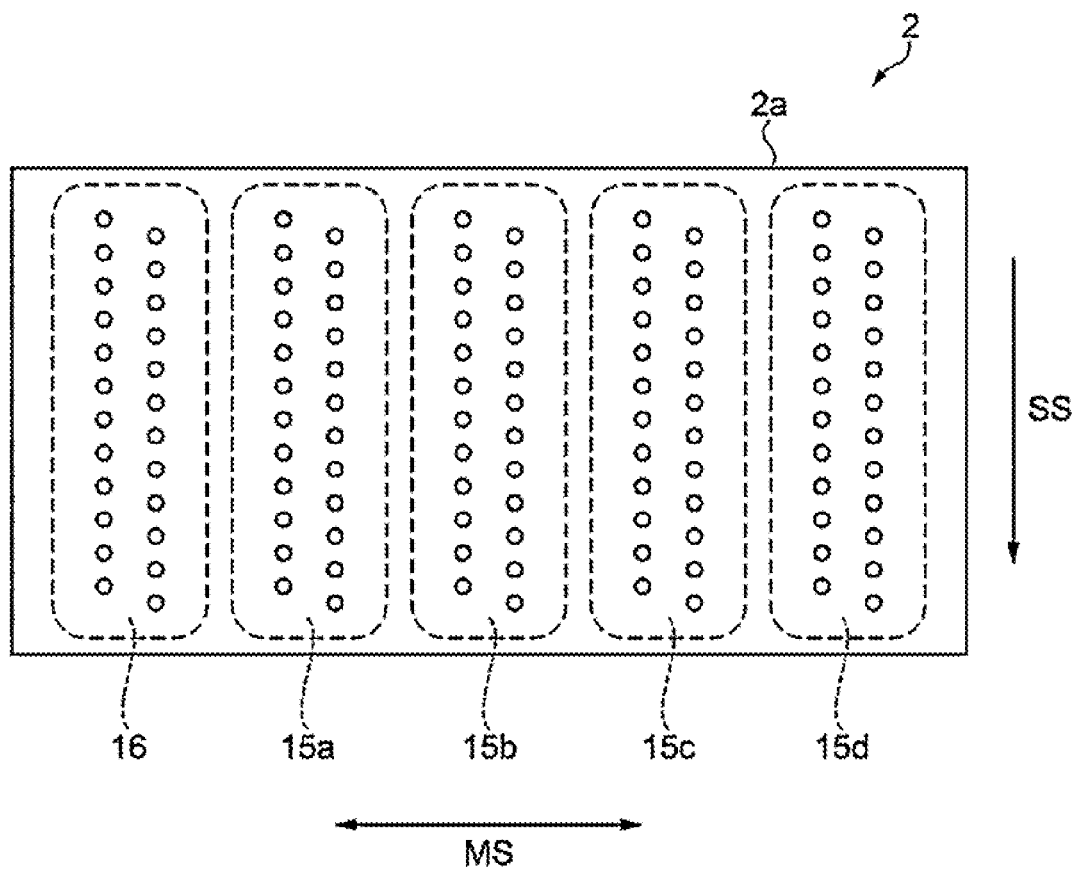
FIG. 3 is a schematic plan view schematically showing an example of an array of nozzle groups in an ink jet head.

FIG. 3 is a schematic plan view schematically showing an example of an array of nozzle groups on a nozzle surface in an ink jet head. As shown in FIG. 3, the ink jet head 2 has a nozzle surface 2a which includes a plurality of nozzles which eject ink. In the example shown in FIG. 3, the nozzle surface 2a of the ink jet head 2 has a plurality of colored ink nozzle groups 15a, 15b, 15c, and 15d, in which a plurality of nozzles which eject colored ink compositions are arrayed in the sub-scanning direction (SS direction in FIG. 3), and a resin liquid nozzle group 16 which ejects resin liquid compositions. In FIG. 3, the plurality of colored ink nozzle groups 15a, 15b, 15c, and 15d and resin liquid nozzle group 16 are each formed of two rows of nozzles shifted by half a pitch with respect to the sub-scanning direction, without being limited thereto. There is no problem if only some of the plurality of colored ink nozzle groups 15a, 15b, 15c, and 15d are used and the configuration may be such that white ink or non-white ink (for example, colored ink compositions such as black ink, cyan ink, magenta ink, and yellow ink) is ejected from some of the plurality of colored ink nozzle groups 15a, 15b, 15c, and 15d. There may be a plurality of resin liquid nozzle groups 16. In the example shown in FIG. 3, there is one resin liquid nozzle group 16. The plurality of colored ink nozzle groups 15a, 15b, 15c, and 15d and the resin liquid nozzle group 16 are arranged in parallel at intervals in the main scanning direction (MS direction in FIG. 3).

Furthermore, in the present embodiment, in an example of the array of the nozzle groups shown in FIG. 3, an example is shown in which the resin liquid nozzle group 16 is at the left end in the main scanning direction of the diagram, but there may be an arrangement in which the resin liquid nozzle group 16 is arrayed at the right end opposite to the left end in the main scanning direction. In addition, there may also be an array in which the resin liquid nozzle groups 16 are arranged at each of the left end and the right end in the main scanning direction of FIG. 3. In addition, there may be an array in which the resin liquid nozzle groups 16 are arranged between the colored ink nozzle groups 15a, 15b, 15c, and 15d in FIG. 3.

2.2. Ink Jet Recording Method

Any one of a line head or a serial head may be used for the ink jet head. The recording method according to the present embodiment is a serial type recording method using the ink jet recording apparatus 1 including the ink jet head 2 described above, in which recording is performed by alternately repeating main scanning, in which ink is ejected and attached to the recording medium 10 while the ink jet head 2 moves relative to the recording medium 10 in the main scanning direction, and sub-scanning, which is the transporting of the recording medium 10 (refer to FIG. 2).

In the case of a serial type recording method, the number of main scans in which the nozzle group of a specific ink used for recording passes opposite to the recording position on the recording medium 10 is referred to as the number of main scans of the ink. The number of main scans is determined for each nozzle group. For example, when ink is filled in one of the nozzle groups in FIG. 3 and this nozzle group is used for recording and when the distance of one sub-scan is a distance of one-half of the length of the sub-scanning direction of the nozzle group, the number of main scans of the ink is 2. It is possible to increase the number of main scans by shortening the distance of one sub-scan or decrease the number by lengthening the distance. A larger number of main scans is preferable in that it is possible to increase the total amount of ink to be attached and to attach ink separately in a plurality of main scans. On the other hand, when the number of main scans is small, it is preferable in that the recording speed is high. The number of main scans is also referred to as the number of passes.

In the present embodiment, the maximum distance of one main scan is preferably 50 cm or more. The "maximum distance of one main scan" refers to the distance at which one point of the ink jet head 2 is facing the recording medium 10 in a case of provisionally recording from end to end in the main scanning direction of the recording medium 10 in one main scan. The distance is preferably 50 cm to 500 cm, more preferably 50 cm to 400 cm, even more preferably 55 cm to 300 cm, and yet more preferably 60 cm to 200 cm. In addition, 70 cm to 190 cm is particularly preferable, 100 cm to 180 cm is more particularly preferable, and 130 cm to 170 cm is even more particularly preferable. By setting the distance to 50 cm or more, it is possible to make the recorded material useful for display purposes or the like. The upper limit of the distance is not particularly limited, but 500 cm or less is preferable from the viewpoint of the configuration of the ink jet recording apparatus 1. When performing recording, a scan which is a distance shorter than the maximum distance of one main scan described above may be performed, depending on the image to be recorded.

It is more preferable to use the recording medium 10 for which the width of the main scan of the recording medium 10 is in the maximum distance range described above. Such a case is preferable in that it is possible to set the maximum distance of one main scan as described above.

2.3. Resin Liquid Composition Attaching Step

The resin liquid composition attaching step is a step for attaching the resin liquid composition forming the ink set according to one embodiment of the disclosure described above to a recording medium. Although the method of attaching the resin liquid composition is not particularly limited, in the present embodiment, from the viewpoint of reducing the size of the ink jet recording apparatus 1, the resin liquid composition is preferably ejected from the ink jet head 2 using an ink jet method.

In the recording method according to the present embodiment, by providing a resin liquid composition attaching step separate from the colored ink composition attaching step described below, it is possible to directly attach the resin liquid composition to the recording medium to be a base layer (undercoat), or it is possible to attach the resin liquid composition from further above the colored ink composition layer attached to the recording medium to form an overcoat. In this manner, it is possible to concentrate the resin liquid composition at the interface of the colored ink composition layer, which tends to reduce the pigment present at the interface and make it possible to prevent deterioration of the laminate peeling strength and blocking resistance. Even when the resin liquid composition is used as an undercoat, the resin liquid composition moves to the air layer interface of the colored ink composition layer. In addition, even when the resin liquid composition is used as an overcoat, the resin liquid composition moves to the interface of the colored ink composition layer with the recording medium. It is possible to control the attachment amount of the resin liquid composition independently from the attachment amount of the colored ink composition, and it is easy to adjust both attachment amounts.

The recording medium is not particularly limited, but it preferably a low-absorbent recording medium or a non-absorbent recording medium, and particularly preferably a non-absorbent recording medium. The description of the recording medium is the same as that in the ink set described above and will not be described again.

In the present embodiment, the resin liquid composition attaching step may be performed before or after the colored ink composition attaching step described below or may be performed at the same time. In the array of nozzle groups shown in FIG. 3, it is possible to attach the resin liquid composition before or at the same time as the colored ink composition by using all nozzles of the resin liquid nozzle group for the resin liquid composition and using only the nozzles downstream in the sub-scanning direction of the colored ink nozzle group for the colored ink composition. In addition, for example, it is possible to attach the resin liquid composition before the colored ink composition by using only the nozzles upstream in the sub-scanning direction of the resin liquid nozzle group for the resin liquid composition and using only the nozzles downstream in the sub-scanning direction of the colored ink nozzle group for the colored ink composition.

In the recording method according to the present embodiment, the resin liquid composition attaching step is more preferably performed before the colored ink composition attaching step. By using such an order, it is possible to directly attach the resin liquid composition to the recording medium. In this manner, the resin liquid composition tends to be concentrated in the colored ink composition layer, in particular, at the interface with the recording medium, the pigments present at the interface tend to be reduced, and it may be possible to further prevent a decrease in the laminate peeling strength and blocking resistance. In addition, the urethane resin contained in the resin liquid composition has an alicyclic structure or aromatic ring structure, which tends to improve wettability, in particular, to recording media formed of polyolefin-based non-polar materials. Therefore, when the resin liquid composition attaching step is performed in an order before the colored ink composition attaching step, even in a case where a polyolefin-based non-polar material is used for the recording medium, it is possible to coat the resin liquid composition uniformly. Due to this, the resin liquid composition is concentrated in the colored ink composition layer, in particular, at the interface with the recording medium, and it tends to be possible to reduce the pigments present at the interface and it may be possible to further prevent a decrease in the laminate peeling strength and blocking resistance.

The recording medium 10 is preferably heated by the pre-heater 7 shown in FIG. 1 before the resin liquid composition attaching step or by the IR heater 3 or platen heater 4 shown in FIG. 1 during the resin liquid composition attaching step. By attaching the resin liquid composition to the heated recording medium 10, the resin liquid composition ejected onto the recording medium 10 is easily wet and spread on the recording medium 10 or on the colored ink composition attached in the colored ink composition attaching step described below and it is possible to uniformly coat the resin liquid composition. In this manner, it may be possible to reduce the pigment present at the interface of the colored ink composition layer and to further prevent a decrease in the laminate peeling strength and blocking resistance.

Here, it is possible to set the surface temperature of the recording medium 10 when attaching the resin liquid composition independently of the temperature in the preferable range of the surface temperature of the recording medium 10 when attaching the colored ink composition described below. For example, the surface temperature of the recording medium 10 when attaching the resin liquid composition is preferably 50° C. or lower, more preferably 45° C. or lower, and even more preferably 38° C. or lower. In addition, the lower limit value of the surface temperature of the recording medium 10 when the resin liquid composition is attached is preferably 25° C. or higher, and more preferably 28° C. or higher. Furthermore, 30° C. or higher is preferable, 35° C. or higher is more preferable, and 40° C. or higher is even more preferable. In a case where the surface temperature of the recording medium 10 when attaching the resin liquid composition is in the range described above, it is possible to uniformly coat the resin liquid composition on the recording medium 10 and to improve the abrasion resistance and image quality. In addition, it is possible to suppress the effect of heat on the ink jet head 2.

2.4. Colored Ink Composition Attaching Step

The colored ink composition attaching step is a step in which a colored ink composition forming the ink set of one embodiment of the disclosure described above is attached to a recording medium by an ink jet method.

In the present embodiment, the colored ink composition attaching step may be performed before or after the resin liquid composition attaching step described above, or may be performed at the same time.

In addition, in the recording method according to the present embodiment, it is preferable to attach to the recording medium the colored ink composition and the resin liquid composition one on another. In this manner, by attaching the compositions one on another, the resin liquid composition is concentrated at the interface of the colored ink composition layer, it may be possible to reduce the pigment present at the interface and to further prevent a decrease in the laminate peeling strength and blocking resistance.

When the colored ink composition is attached to the recording medium such that the colored ink composition partially or fully overlaps the region to which the resin liquid composition is applied, the colored ink composition may be attached such that at least a part of the region to which the resin liquid composition is applied overlaps therewith. Specifically, the colored ink composition is preferably attached such that 50% or more of the region to which the resin liquid composition is applied overlaps therewith, more preferably attached such that 60% or more overlaps therewith, and even more preferably attached such that 70% or more overlaps therewith.

In addition, when the resin liquid composition is attached to the recording medium so as to partially or fully overlap with the region to which the colored ink composition is applied, the resin liquid composition may be attached such that at least a part of the region to which the colored ink composition is applied overlaps therewith. Specifically, the resin liquid composition is preferably attached such that 50% or more of the region to which the colored ink composition is applied overlaps therewith, more preferably attached such that 60% or more overlaps therewith, and even more preferably attached such that 70% or more overlaps therewith.

In the present specification, a case of referring to a "region" refers to a portion occupying a certain area on the recording medium such that the amount of ink attached to the region is approximately constant. A region is a region able to be visually seen in the same color, for example, an area of 1 mm² or more. In addition, the attachment amount being approximately constant signifies that, for example, when the Duty is low, the ink attachment amount is strictly different between a position where the ink dot is landed and a position where the ink dot is not landed, but the region is a macroscopic (macro) range larger than the area of one dot and the ink attachment amount is macroscopically constant within the region and non-uniformity of the attachment amount due to the presence or absence of ink dots is ignored.

In addition, in the case of a low Duty, even in a region where both the resin liquid composition and the colored ink composition are attached, for example, there may be sites where the resin liquid dots and colored ink dots do not overlap on a microscopic scale of droplets (dots that have landed) in the ink jet method; however, with a laminate of inks viewed on a macroscopic scale, the fact that there are sites where the dots do not overlap in the case of a dot-by-dot basis is ignored. Accordingly, here, the attachment region is considered to be the region where the resin liquid composition and colored ink composition are laminated as a whole region.

In the present specification, "Duty" is a value calculated by Equation (1).

$$\text{Duty (\%)} = \{\text{Actual number of dots printed}/(\text{Vertical resolution} \times \text{Horizontal resolution})\} \times 100 \quad (1)$$

(In the equation, "Actual number of dots printed" is the actual number of dots printed per unit area, and "Vertical resolution" and "Horizontal resolution" are the resolutions per unit area, respectively.)

Furthermore, in the recording method according to the present embodiment, in the colored ink composition attaching step, a non-white ink containing a non-white pigment and a white ink containing a white pigment may be used as the colored ink composition and the non-white ink and the white ink may be attached on one another. Here, "attached on one another" is the same as above. According to the recording method according to the present embodiment, even in this form, it is possible to achieve both an excellent nozzle clogging recovery property and excellent laminate peeling strength and blocking resistance of the recorded material.

Examples of such forms of attaching non-white ink and white ink on one another include attachment of the non-white ink after attachment of the white ink and attachment of the white ink after attachment of the non-white ink.

Among the above, performing the attachment of white ink after the attachment of non-white ink is particularly preferable from the viewpoint of being able to better obtain the effect of the disclosure. Such a recording method is called back-printing and, in general, the recording is carried out on transparent media and the recorded material is used by being viewed from the rear side of the recording surface.

The colored ink composition attaching step may include a heating step (also referred to below as the "primary heating step"), in which the recording medium 10 is heated by the IR heater 3 or the platen heater 4 before the colored ink composition attaching step or at the same time as the colored ink composition attaching step, and is preferably performed on the recording medium 10 heated by the primary heating step. By the primary heating step, it is possible to dry the colored ink composition quickly on the recording medium 10, to suppress bleeding, and to form an image with excellent image quality.

The upper limit of the surface temperature of the recording medium 10 when the colored ink composition is attached to the recording medium 10 by the primary heating step is preferably 50° C. or lower, more preferably 45° C. or lower, and even more preferably 40° C. or lower. By setting the surface temperature of the recording medium when the colored ink composition is attached to the surface in the above ranges, it is possible to suppress the effect of heat on the ink jet head 2 and to prevent clogging of the ink jet head 2 and nozzles. In addition, the lower limit of the surface temperature of the recording medium 10 during ink jet recording is preferably a temperature higher than room temperature, preferably 28° C. or higher, more preferably 30° C. or higher, and even more preferably 32° C. or higher. By setting the surface temperature of the recording medium when the colored ink composition is attached in the above ranges, it is possible to quickly dry and fix the colored ink composition on the recording medium 10 at an early stage, to suppress bleeding, and to form an image with excellent image quality.

2.5. Drying Step

The recording method according to the present embodiment may include a step for drying the attached ink after the above colored ink composition attaching step or resin liquid composition attaching step. The drying may be performed at room temperature or by heating the recording medium 10 to which the ink is attached. The heating is also referred to below as a "secondary heating step," and may be, for example, a drying step in which the recording medium 10 to which the ink is attached is heated by the heating heater 5 shown in FIG. 1.

The heating may be performed by, for example, a radiant type system, such as an IR heater, which radiates radiation emitting heat to the recording medium 10 a transmission type system which conducts heat to the recording medium 10 from a member which contacts the recording medium 10, a blowing type system which blows warm air to the recording medium 10, or the like. Due to this, the resin and the like included in the ink on the recording medium 10 melt to form an ink film, the ink film is firmly fixed on the recording medium 10 to have excellent film-forming properties, and it is possible to obtain a high-quality image with excellent abrasion resistance in a short time, which is preferable.

The upper limit of the surface temperature of the recording medium 10 due to the drying is preferably 120° C. or lower, more preferably 110° C. or lower, and even more preferably 100° C. or lower. In addition, the lower limit of the surface temperature of the recording medium 10 is preferably 60° C. or higher, more preferably 70° C. or higher, and even more preferably 80° C. or higher. By setting the temperature in the above ranges, the clogging recovery property is ensured and it is possible to obtain a high-quality image with excellent abrasion resistance in a short time.

After the drying step, there may be a step of cooling the ink on the recording medium 10 by the cooling fan 6 shown in FIG. 1.

2.6. Other Steps

The recording method according to the present embodiment may include a cleaning step in which ink is discharged by a unit other than the pressure generating unit for ejecting ink for recording, that is, by other mechanisms which are not the mechanisms for ejecting ink for recording provided in the ink jet head 2.

Examples of mechanisms for ejecting ink for recording provided in the ink jet head 2 include a piezoelectric element or a heater element which is provided in a pressure chamber (not shown) and which applies pressure to the ink. This cleaning step may also be a step for discharging ink from the nozzles by applying pressure to the ink jet head 2 from outside. By providing this step, even when there is a concern that resin may be welded to the inner wall of the ink jet head 2, it is possible to suppress this welding and to obtain superior ejection stability.

Examples of the other mechanisms in the cleaning step described above include a mechanism for the application of negative pressure and the application of positive pressure from upstream of the ink jet head 2. The above are not carrying out ink discharging, that is, flushing, by the function of the ink jet head 2 itself. In other words, the ink is not discharged using the function of ejecting ink from the ink jet head 2 during recording.

3. EXAMPLES

A more detailed description will be given of the disclosure using Examples, but the disclosure is not limited to these Examples. Below, "%" is based on mass, unless otherwise stated.

3.1. Synthesis of Urethane Resin

Each urethane resin emulsion was prepared in the following manner.

Preparation of Urethane Resin Emulsion A1

Into a reaction container in which a stirrer, a reflux cooling pipe, and a thermometer were inserted, 220 g of polytetramethylene glycol (PTMG 2000 manufactured by Mitsubishi Chemical Corporation, number average molecular weight 2000), 140 g of 2,2-dimethylolpropionic acid (DMPA), and 130 g of methyl ethyl ketone (MEK, bp 79.6° C.) were charged under a stream of nitrogen and heated to 65° C. to dissolve the DMPA. 330 g of 4,4'-dicyclohexylmethane diisocyanate (MCHDI) and 0.26 g of urethanization catalyst XK-614 (manufactured by Kusumoto Chemical Co., Ltd.) were added thereto and heated to 75° C., a urethanization reaction was carried out for 5 hours, and an isocyanate-terminated urethane prepolymer was obtained.

Next, the reaction mixture was cooled to 70° C., 40 g of triethanolamine was added thereto and mixed and 800 g was extracted therefrom and added to a mixed solution of 540 g of water and 40 g of triethanolamine under strong stirring. Next, 160 g of ice was introduced therein, 28 g of a 35% by weight bicycloheptane dimethanamine (BCHDMA) aqueous solution was added to carry out a chain extension reaction, and a part of the methyl ethyl ketone and water was removed such that the solid concentration was 30% to obtain a urethane resin emulsion A1 (urethane resin component 30%, water 70%, acid value 80 mg KOH/g).

Preparation of Urethane Resin Emulsion A2

A urethane resin emulsion A2 (urethane resin component 30%, water 70%, acid value 80 mg KOH/g) was obtained in the same manner as the manufacturing of the urethane resin emulsion A1, except that, instead of 330 g of 4,4'-dicyclohexylmethane diisocyanate (MCHDI), 280 g of isophorone diisocyanate (IPDI) was used, and the polytetramethylene glycol (PTMG 2000 manufactured by Mitsubishi Chemical Corporation, number average molecular weight 2000) was set to 260 g and the 2,2-dimethylolpropionic acid (DMPA) was set to 138 g.

Preparation of Urethane Resin Emulsion A3

A urethane resin emulsion A3 (urethane resin component 30%, water 70%, acid value 80 mg KOH/g) was obtained in the same manner as the manufacturing of the urethane resin emulsion A1, except that, instead of 330 g of 4,4'-dicyclohexylmethane diisocyanate, 235 g of 1,3-bis(isocyanate methyl)cyclohexane (BIMCH) was used, and PTMG 2000 was set to 275 g and DMPA was set to 130 g.

Preparation of Urethane Resin Emulsion A4

A urethane resin emulsion A4 (urethane resin component 30%, water 70%, acid value 80 mg KOH/g) was obtained in the same manner as the manufacturing of the urethane resin emulsion A2, except that, instead of 280 g of isophorone diisocyanate (IPDI), 300 g of m-bis(isocyanate propyl)benzene (BICPB) was used, the polytetramethylene glycol (PTMG 2000 manufactured by Mitsubishi Chemical Corporation, number average molecular weight 2000) was set to 200 g, the 2,2-dimethylolpropionic acid (DMPA) was set to 130 g, and the bicycloheptanedimethanamine (BCHDMA) aqueous solution was set to 55 g.

Preparation of Urethane Resin Emulsion A5

A urethane resin emulsion A5 (urethane resin component 30%, water 70%, acid value 80 mg KOH/g) was obtained in the same manner as the manufacturing of the urethane resin emulsion A1, except that, instead of 280 g of 4,4'-dicyclohexylmethane diisocyanate (MCHDI), 208 g of m-bis(isocyanate methyl)benzene (BICMB) was used, the polytetramethylene glycol (PTMG 2000 manufactured by Mitsubishi Chemical Corporation, number average molecular weight 2000) was set to 157 g, and the 2,2-dimethylolpropionic acid (DMPA) was set to 125 g.

Preparation of Urethane Resin Emulsion A6

A polyether-based urethane resin emulsion A6 (urethane resin component 30%, water 70%, acid value 80 mg KOH/g) was obtained in the same manner as the manufacturing of the urethane resin emulsion A2, except that, instead of 260 g of polytetramethylene glycol (PTMG 2000 manufactured by Mitsubishi Chemical Corporation, number average molecular weight 2000), 194 g of polytetramethylene glycol (PTMG 3000 manufactured by Mitsubishi Chemical Corporation, number average molecular weight 3000), and 16 g of polytetramethylene glycol (PTMG 250 manufactured by Mitsubishi Chemical Corporation, number average molecular weight 250) were added, and used with an average molecular weight of the polytetramethylene glycol of 450.

Preparation of Urethane Resin Emulsion A7

A polyether-based urethane resin emulsion A7 (urethane resin component 30%, water 70%, acid value 55 mg KOH/g) was obtained in the same manner as the manufacturing of the urethane resin emulsion A2, except that, instead of 260 g of polytetramethylene glycol (PTMG 2000 manufactured by Mitsubishi Chemical Corporation, number average molecular weight 2000), 520 g of polytetramethylene glycol (PTMG 4000 manufactured by Mitsubishi Chemical Corporation, number average molecular weight 4000) was used and the 2,2-dimethylolpropionic acid (DMPA) was set to 117 g.

Preparation of Urethane Resin Emulsion A8

A polyether-based urethane resin emulsion A8 (urethane resin component 30%, water 70%, acid value 80 mg KOH/g) was obtained in the same manner as the manufacturing of the urethane resin emulsion A2, except that 260 g of polytetramethylene glycol (PTMG 2000 manufactured by Mitsubishi Chemical Corporation, number average molecular weight 2000) was changed to 253 g of polyoxypropylene glycol (PPG 2000, number average molecular weight 2000) and 1 g of trimethylolpropane (TMP) was added.

Preparation of Urethane Resin Emulsion A9

A urethane resin emulsion A9 (urethane resin component 30%, water 70%, acid value 89 mg KOH/g) was obtained in the same manner as the manufacturing of the urethane resin emulsion A2, except that, instead of 280 g of isophorone diisocyanate (IPDI), 210 g of 1,6-hexamethylene diisocyanate (1,6-HDDI) was used.

Preparation of Urethane Resin Emulsion A10

A urethane resin emulsion A10 (urethane resin component 30%, water 70%, acid value 102 mg KOH/g) was obtained in the same manner as the manufacturing of the urethane resin emulsion A2, except that 138 g of 2,2-dimethylolpropionic acid (DMPA) was changed to 115 g, 280 g of isophorone diisocyanate (IPDI) was changed to 210 g, 260 g of polytetramethylene glycol (PTMG 2000 manufactured by Mitsubishi Chemical Corporation, number average molecular weight 2000) was changed to 125 g, and the 35% by weight bicycloheptanedimethanamine (BCHDMA) aqueous solution was set to 7 g.

Preparation of Urethane Resin Emulsion A11

A urethane resin emulsion A11 (urethane resin component 30%, water 70%, acid value 49 mg KOH/g) was obtained in the same manner as the manufacturing of the urethane resin emulsion A2, except that 138 g of 2,2-dimethylolpropionic acid (DMPA) was changed to 40 g, 280 g of isophorone diisocyanate (IPDI) was changed to 100 g, and the bicycloheptanedimethanamine (BCHDMA) aqueous solution was set to 7 g.

The urethane resin emulsions A1 to A11 described above are summarized in Table 1 below. The unit of the addition amounts shown in Table 1 below is g.

TABLE 1

| | | | A1 | A2 | A3 | A4 | A5 | A6 | A7 | A8 | A9 | A10 | A11 |
|---|---|---|---|---|---|---|---|---|---|---|---|---|---|
| Polyisocyanate | Alicyclic | MCHDI | 330 | | | | | | | | | | |
| | | IPDI | | 280 | | | | 280 | 280 | 280 | | 210 | 100 |
| | | BIMCH | | | 235 | | | | | | | | |
| | Aromatic | BICPB | | | | 300 | | | | | | | |
| | | BICMB | | | | | 208 | | | | | | |
| | Aliphatic | 1,6-HDDI | | | | | | | | | 210 | | |
| Polyol | | PTMG250 | | | | | | 16 | | | | | |
| | | PTMG2000 | 220 | 260 | 275 | 200 | 157 | | | | 260 | 125 | 260 |
| | | PTMG3000 | | | | | | 194 | | | | | |
| | | PTMG4000 | | | | | | | 520 | | | | |
| | | PPG2000 | | | | | | | | 253 | | | |
| | | TMP | | | | | | | | 1 | | | |
| Other | | DMPA | 140 | 138 | 130 | 130 | 125 | 138 | 117 | 138 | 138 | 115 | 40 |
| | | BCHDMA | 28 | 28 | 28 | 55 | 28 | 28 | 28 | 28 | 28 | 7 | 7 |
| | | XK-614 | 0.26 | 0.26 | 0.26 | 0.26 | 0.26 | 0.26 | 0.26 | 0.26 | 0.26 | 0.26 | 0.26 |
| Acid value (mgKOH/g) | | | 80 | 80 | 80 | 80 | 80 | 80 | 55 | 80 | 89 | 102 | 49 |

3.2. Preparation of Resin Liquid Composition and Colored Ink Composition

After mixing and sufficiently stirring each of the components shown in Table 2 below, each of the resin liquid compositions was prepared by performing decompression filtration using a microfilter (manufactured by Millipore) with a pore size of 5.0 μm. In addition, each colored ink composition was obtained by mixing and stirring each component to achieve the blending ratios shown in Table 3 below, filtering through a membrane filter with a pore size of 10 μm, and carrying out a degassing treatment using a vacuum pump. The compositions of each resin liquid composition and each colored ink composition are shown in Table 2 below.

The unit of content of the resin liquid composition and colored ink composition shown in Table 2 below is % by mass and the content of pigment and urethane resin emulsion represents the solid content equivalent. In addition, the remaining amount being ion exchange water indicates that an amount making the total mass of the composition 100% by mass was added.

For the pigments (P.B. 15:3 and P.W. 6) used in the preparation of the colored ink composition, pigment dispersion solutions were prepared in advance as follows and these were used in the preparation of the colored ink compositions.

Preparation of White Pigment Dispersion Solution

First, 4 parts by mass of acrylic acid-acrylic acid ester copolymer (weight average molecular weight 25,000, acid value 18) as a resin dispersing agent were added to and dissolved in 155 parts by mass of ion exchange water in which 0.1 part by mass of a 30% ammonia aqueous solution (neutralizer) was dissolved. To the above, 40 parts by mass of titanium dioxide (C.I. Pigment White 6), which was a white pigment, were added and a dispersion treatment was performed in a ball mill using zirconia beads for 10 hours. After that, centrifugal filtration was performed using a centrifuge to remove impurities such as coarse particles and dust such that the concentration of the white pigment was adjusted to 20% by mass to obtain a white pigment dispersion solution. The particle diameter of the white pigment was 350 nm in average particle diameter.

Preparation of Non-White Pigment Dispersion Solution

First, 7.5 parts by mass of acrylic acid-acrylic acid ester copolymer (weight average molecular weight 25,000, acid value 180) as a resin dispersing agent were added to and dissolved in 160.5 parts by mass of ion exchange water in which 2 parts by mass of a 30% ammonia aqueous solution (neutralizer) were dissolved. To the above, 30 parts by mass of C.I. Pigment Blue 15:3 were added as a cyan pigment and a dispersion treatment was performed in a ball mill using zirconia beads for 10 hours. After that, centrifugal filtration was performed using a centrifuge to remove impurities such as coarse particles and dust such that the cyan pigment concentration was adjusted to 15% by mass to obtain a non-white pigment (cyan pigment) dispersion solution. The particle diameter of the cyan pigment at this time was 100 nm in average particle diameter.

TABLE 2

| | | Resin liquid composition | | | | | | | | |
|---|---|---|---|---|---|---|---|---|---|---|
| | | CL1 | CL2 | CL3 | CL4 | CL5 | CL6 | CL7 | CL8 | CL9 |
| Pigment (solid content) | P.B.15:3 | | | | | | | | | |
| | P.W.6 | | | | | | | | | |
| Urethane resin emulsion (solid content) | A1 | 4.0 | | | | | | | | |
| | A2 | | 4.0 | | | | | | | |
| | A3 | | | 4.0 | | | | | | |
| | A4 | | | | 4.0 | | | | | |
| | A5 | | | | | 4.0 | | | | |
| | A6 | | | | | | 4.0 | | | |
| | A7 | | | | | | | 4.0 | | |
| | A8 | | | | | | | | 4.0 | |
| | A9 | | | | | | | | | 4.0 |
| | A10 | | | | | | | | | |
| | A11 | | | | | | | | | |
| Other | Acrylic resin | | | | | | | | | |
| | 1,2-HD | 4.0 | 4.0 | 4.0 | 4.0 | 4.0 | 4.0 | 4.0 | 4.0 | 4.0 |
| | PG | 15.0 | 15.0 | 15.0 | 15.0 | 15.0 | 15.0 | 15.0 | 15.0 | 15.0 |
| | 2P | | | | | | | | | |
| | SAG503A | 0.5 | 0.5 | 0.5 | 0.5 | 0.5 | 0.5 | 0.5 | 0.5 | 0.5 |
| | TiPA | 0.2 | 0.2 | 0.2 | 0.2 | 0.2 | 0.2 | 0.2 | 0.2 | 0.2 |
| | EDTA | 0.02 | 0.02 | 0.02 | 0.02 | 0.02 | 0.02 | 0.02 | 0.02 | 0.02 |
| | Ion exchange water | Remainder | Remainder | Remainder | Remainder | Remainder | Remainder | Remainder | Remainder | Remainder |
| Total | | 100 | 100 | 100 | 100 | 100 | 100 | 100 | 100 | 100 |
| Evaluation | Clogging recovery property | A | A | A | A | A | B | B | A | B |

| | | Resin liquid composition | | | | White ink | | | Non-white ink | |
|---|---|---|---|---|---|---|---|---|---|---|
| | | CL10 | CL11 | CL12 | CL13 | W1 | W2 | W3 | C1 | C2 |
| Pigment (solid content) | P.B.15:3 | | | | | | | | 4.0 | 4.0 |
| | P.W.6 | | | | | 15.0 | 15.0 | 15.0 | | |
| Urethane resin emulsion (solid content) | A1 | | | 2.0 | 4.0 | | 4.0 | | | 4.0 |
| | A2 | | | | | | | | | |
| | A3 | | | | | | | | | |
| | A4 | | | | | | | | | |
| | A5 | | | | | | | | | |
| | A6 | | | | | | | | | |
| | A7 | | | | | | | | | |
| | A8 | | | | | | | | | |
| | A9 | | | | | | | | | |
| | A10 | 4.0 | | | | | | | | |
| | A11 | | 4.0 | | | | | | | |
| Other | Acrylic resin | | | | | | | 4.0 | | |
| | 1,2-HD | 4.0 | 4.0 | 4.0 | 4.0 | 4.0 | 4.0 | 4.0 | 4.0 | 4.0 |
| | PG | 15.0 | 15.0 | 15.0 | 15.0 | 15.0 | 15.0 | 15.0 | 15.0 | 15.0 |
| | 2P | | | | 10.0 | | | | | |

TABLE 2-continued

| | | | | | | | | | |
|---|---|---|---|---|---|---|---|---|---|
| SAG503A | 0.5 | 0.5 | 0.5 | 0.5 | 0.5 | 0.5 | 0.5 | 0.5 | 0.5 |
| TiPA | 0.2 | 0.2 | 0.2 | 0.2 | 0.2 | 0.2 | 0.2 | 0.2 | 0.2 |
| EDTA | 0.02 | 0.02 | 0.02 | 0.02 | 0.02 | 0.02 | 0.02 | 0.02 | 0.02 |
| Ion exchange water | Remainder | Remainder | Remainder | Remainder | Remainder | Remainder | Remainder | Remainder | Remainder |
| Total | 100 | 100 | 100 | 100 | 100 | 100 | 100 | 100 | 100 |
| Evaluation Clogging recovery property | B | C | A | B | A | C | B | A | B |

The details of the components in the Table 2 described above are as follows.

Pigment
- P.B.15:3 (C.I. Pigment Blue 15:3, non-white pigment)
- P.W.6 (C.I. Pigment White 6, white pigment) Other
- Acrylic resin (styrene-acrylic resin, product name "Joncryl 62J", manufactured by BASF Japan)
- 1,2-HD (1,2-hexanediol)
- PG (propylene glycol)
- 2P (2-pyrrolidone, nitrogen-containing solvent)
- SAG503A (product name "Silface SAG503A" manufactured by Nissin Chemical Industry Co., Ltd., silicone-based surfactant)
- TiPA (triisopropanolamine, pH adjusting agent)
- EDTA (ethylenediamine tetraacetate disodium salt, chelating agent)

3.3. Preparation of Recorded Material for Evaluation

Each of the colored ink compositions and each of the resin liquid compositions obtained as described above were filled into respective ink cartridges and mounted in an ink jet printer. As the ink jet printer, an ink jet printer (product name "PX-G930") manufactured by Seiko Epson Corporation was modified and used ("PX-G930" modified machine). A heater was attached to a platen portion and configured to enable heating of the recording medium during printing. The order in which the colored ink composition and resin liquid composition were attached to the recording medium and the inks used were set to the conditions described in Table 3 to Table 5 below and the recording medium surface temperature in the platen region was set to 45° C. Printing was carried out at a dot density of 1440 dpi×1440 dpi such that the recording duty was 100%. The "recording duty was 100%" refers to the recording duty of a solid image recorded under the condition that one ink droplet with a mass of 14 ng±10% per droplet is applied to a unit region of 1/1440 inch×1/1440 inch. As the recording medium, a corona-treated PET film (manufactured by Futamura Chemical Co., Ltd., product name "FE-2001", 50 μm thick) was used. The environment around the printer at the time of printing was a temperature of 23° C. and a relative humidity of 55%. After the attachment of the ink and the like was completed, the recording medium was heated and dried in an oven at a recording medium surface temperature of 75° C. for 3 minutes to obtain the recorded material.

In Table 3 to Table 5 below, "Resin liquid (undercoat)" indicates the conditions under which the resin liquid composition is attached to the recording medium before the ink attachment. "First layer ink" in Table 3 to Table 5 below refers to the ink to be attached first as ink and, when the resin liquid composition in the "Resin liquid (undercoat)" is attached, indicates the conditions under which the colored ink composition is attached for printing so as to overlap the resin liquid composition. The "Second layer ink" in Table 3 to Table 5 below refers to the ink to be attached second as ink and indicates the conditions under which the second colored ink composition is attached for printing so as to overlap the attached colored ink composition in the "First layer ink". "Resin liquid (overcoat)" in Table 3 to Table 5 below indicates the conditions under which the resin liquid composition is attached for printing so as to overlap the attached colored ink composition in the "First layer ink" or "Second layer ink".

TABLE 3

| | Example 1 | Example 2 | Example 3 | Example 4 | Example 5 | Example 6 | Example 7 | Example 8 | Example 9 |
|---|---|---|---|---|---|---|---|---|---|
| Resin liquid (undercoat) | CL1 | CL2 | CL3 | CL4 | CL5 | CL6 | CL7 | CL8 | CL12 |
| First layer ink | W1 | W1 | W1 | W1 | W1 | W1 | W1 | W1 | W1 |
| Second layer ink | — | — | — | — | — | — | — | — | — |
| Resin liquid (overcoat) | — | — | — | — | — | — | — | — | — |
| Laminate peeling strength | B | A | A | A | A | B | C | C | C |
| Blocking resistance | A | A | A | B | B | B | B | B | A |

TABLE 4

| | Example 10 | Example 11 | Example 12 | Example 13 | Example 14 | Example 15 | Example 16 | Example 17 | Example 18 | Example 19 |
|---|---|---|---|---|---|---|---|---|---|---|
| Resin liquid (undercoat) | CL13 | CL1 | — | — | CL4 | CL1 | CL2 | CL3 | CL4 | CL1 |
| First layer ink | W1 | C1 | C1 | C2 | W3 | C1 | C1 | C1 | C1 | W2 |
| Second layer ink | — | W1 | W1 | W1 | — | — | W1 | W1 | W1 | — |

TABLE 4-continued

| | Example 10 | Example 11 | Example 12 | Example 13 | Example 14 | Example 15 | Example 16 | Example 17 | Example 18 | Example 19 |
|---|---|---|---|---|---|---|---|---|---|---|
| Resin liquid (overcoat) | — | — | CL1 | CL1 | — | — | — | — | — | — |
| Laminate peeling strength | A | A | C | B | B | A | A | A | A | A |
| Blocking resistance | B | A | A | A | A | B | A | A | B | A |

TABLE 5

| | Comparative Example 1 | Comparative Example 2 | Comparative Example 3 | Comparative Example 4 | Comparative Example 5 | Comparative Example 6 | Comparative Example 7 | Comparative Example 8 | Comparative Example 9 |
|---|---|---|---|---|---|---|---|---|---|
| Resin liquid (undercoat) | CL9 | CL9 | CL10 | CL10 | CL10 | CL11 | CL11 | CL11 | — |
| First layer ink | W1 | C1 | W1 | C1 | C1 | W1 | C1 | C1 | C2 |
| Second layer ink | — | W1 | — | — | W1 | — | — | W1 | — |
| Resin liquid (overcoat) | — | — | — | — | — | — | — | — | — |
| Laminate peeling strength | D | D | C | B | C | D | D | D | C |
| Blocking resistance | C | B | C | C | C | A | C | B | C |

3.4. Evaluation Method 3.4.1. Laminate Peeling Strength Test

TM-569 (main agent) and CAT-10L (curing agent), which are aliphatic esters manufactured by Toyo-Morton, were coated on each of the recorded materials obtained above using a test laminator (manufactured by Musashino Kikai Co., Ltd.) so as to have a coating volume of 2.5 g (non-volatile content)/m$^2$ and the diluted solvent was volatilized and dried with a dryer.

The adhesive surface of each recorded material on which the adhesive composition was coated was laminated with a sealant film (PE film, manufactured by Mitsui Tohcello, product name "TUX-HCE", 60 μm thick). Next, the adhesive composition was cured by aging the laminated film at 40° C. for 3 days to obtain a laminated film sheet.

Samples of each laminated film were cut into 15 mm widths and peeling strength tests were conducted using a "TENSILON RTG1250" tensile testing machine manufactured by A&D Company, Limited. Using a 50N load cell, the tests were performed at a speed of 5 mm/s. The sample was folded to 180°, peeled off 25 mm from the test plate, fixed in a chuck, the first 25 mm after the measurement was ignored, then the measurement value of the length of 50 mm therefrom was measured three times each, and the average value thereof was used to determine the laminate peeling strength according to the following evaluation criteria.

(Evaluation Criteria)

A: The average value of the three measurements was 3N/15 mm or more.

B: The average value of the three measurements was 1N/15 mm or more and less than 3N/15 mm.

C: The average value of the three measurements was 0.5 N/15 mm or more and less than 1 N/15 mm.

D: The average value of the three measurements was less than 0.5N/15 mm.

3.4.2. Clogging Recovery Property Test

The colored ink composition and the resin liquid composition were filled into the above ink jet printer and ejection was confirmed for all the nozzles in the nozzle row. Thereafter, the printer was left in an environment with a temperature of 40° C. and relative humidity of 20% for two days. After being left, the colored ink composition and resin liquid composition were ejected from all nozzles, cleaning was repeatedly carried out, and the number of times of cleaning at this time was measured. Based on the number of times of cleaning, the clogging recovery property was evaluated according to the following evaluation criteria.

(Evaluation Criteria)

A: Ink was ejected from all nozzles with one to two times of cleaning.

B: Ink was ejected from all nozzles with 3 to 4 times of cleaning.

C: There were nozzles where no ink was ejected with 4 times of cleaning.

3.4.3. Evaluation Test for Blocking Resistance

A sample was prepared by overlapping the printed surface of the recorded material obtained in "3.3. Preparation of Recorded Material for Evaluation" above with the unprinted surface of the recorded material (not subjected to a non-corona treatment). Using this sample, the sample was left at 5 kgf/cm$^2$ (50 mmφ) for 24 hours at 50° C. using the "CO-201 blocking tester" manufactured by Tester Sangyo Co., Ltd. After being left, the overlapped films were peeled off and the blocking resistance was evaluated according to the following evaluation criteria.

(Evaluation Criteria)

A: No transfer.

B: Slight transfer.

C: Clear transfer.

3.5. Evaluation Results

The results of the evaluation tests are shown in Table 2 to Table 5 above.

From the above evaluation results, each Example had excellent laminate peeling strength and blocking resistance. On the other hand, in each of the Comparative Examples, one or both of the laminate peeling strength or the blocking resistance was inferior.

In more detail, from Examples 1 and 15, the laminate peeling strength was slightly lower when the colored ink composition was white ink while the blocking resistance was slightly lower when the colored ink composition was non-white ink.

From Examples 1 and 10, when a nitrogen-containing solvent was contained in the resin liquid composition, the laminate peeling strength was improved, but the clogging recovery property was slightly decreased.

From Examples 1 and 11, even in a case where a white ink was used, when the ink composition directly overlapped on the resin liquid composition was a non-white ink, the laminate peeling strength was improved.

From Examples 11 and 12, when the resin liquid composition was not directly attached to the recording medium, the laminate peeling strength decreased.

From Examples 12 and 13, when the urethane resin emulsion A1 was included in the non-white ink, the laminate peeling strength increased.

From Examples 4 and 14, when acrylic resin was contained in the white ink, the blocking resistance improved, but the laminate peeling strength decreased.

In Example 19, the laminate strength and blocking resistance were excellent. When the urethane resin emulsion A1 was contained in the white ink, the clogging recovery property decreased.

In contrast, since Comparative Examples 1 and 2 did not use a resin liquid composition containing a urethane resin having an alicyclic structure or aromatic structure, the result was that the laminate peeling strength and blocking resistance were inferior.

In Comparative Examples 3 to 8, since the acid value of the urethane resin contained in the resin liquid composition was not within a predetermined range, the result was that the laminate peeling strength and blocking resistance were inferior.

From Comparative Example 9, it was found that, without using the resin liquid composition, even if the urethane resin emulsion A1 was contained in the colored ink composition, the effect of improving the laminate peeling strength and blocking resistance was not obtained.

It is possible to derive the following information from the embodiments described above.

An aspect of an ink set includes a colored ink composition, which contains a pigment and is a water-based ink jet ink, and a water-based resin liquid composition which contains a resin, in which the resin liquid composition contains a urethane resin having an alicyclic structure or an aromatic ring structure and an acid value of 50 to 100 mg KOH/g.

In the aspect of the ink set described above, the urethane resin may use, as a constituent component, one or more selected from dicyclohexylmethane diisocyanate, isophorone diisocyanate, 1,3-bis(isocyanate methyl)cyclohexane, m-bis(isocyanate propyl)benzene, and m-bis(isocyanate methyl)benzene.

In the aspect of the ink set described above, the colored ink composition may include a white ink containing a white pigment and a non-white ink containing a non-white pigment.

In the aspect of the ink set described above, the colored ink composition may be a white ink containing a white pigment.

In the aspect of the ink set described above, the content of the white pigment in the white ink may be 5% to 20% by mass.

In the aspect of the ink set described above, the urethane resin may use polytetramethylene glycol as a constituent component.

In the aspect of the ink set described above, the polytetramethylene glycol may have a number average molecular weight of 500 to 3000.

In the aspect of the ink set described above, the colored ink composition may contain a resin other than the urethane resin.

In the aspect of the ink set described above, the colored ink composition may contain an acrylic-based resin.

In the aspect of the ink set described above, a content of the urethane resin in the resin liquid composition may be 1% to 15% by mass.

In the aspect of the ink set described above, the urethane resin may be resin particles.

In the aspect of the ink set described above, the resin liquid composition may not contain more than 10% by mass of a nitrogen-containing solvent.

In the aspect of the ink set described above, the ink set may be used for recording on a low-absorbent recording medium or a non-absorbent recording medium.

In the aspect of the ink set described above, a recorded material recorded using the ink set of any of the aspects described above may be used with a sealant film treatment applied to a recording surface.

An aspect of a recording method includes a colored ink composition attaching step of attaching a colored ink composition to a recording medium by an ink jet method, and a resin liquid composition attaching step of attaching a resin liquid composition to the recording medium.

In the aspect of the recording method described above, the colored ink composition and the resin liquid composition may be attached to the recording medium one on another.

In the aspect of the recording method described above, the resin liquid composition attaching step may be performed before the colored ink composition attaching step.

In the aspect of the recording method described above, in the colored ink composition attaching step, a non-white ink containing a non-white pigment and a white ink containing a white pigment may be used as the colored ink composition, and the non-white ink and the white ink may be attached one on another.

In the aspect of the recording method described above, in the colored ink composition attaching step, the white ink may be attached after the non-white ink is attached.

The disclosure is not limited to the above-described embodiments, and various modifications thereto are possible. For example, the disclosure includes configurations substantially the same as the configuration described in the embodiment, for example, a configuration having the same function, a method and a result, or a configuration having the same object and effect. In addition, the disclosure includes a configuration in which non-essential parts of the configuration described in the embodiment are replaced. In addition, the disclosure includes a configuration which achieves the same operation and effect as the configuration described in the embodiment, or a configuration which is able to achieve the same object. In addition, the disclosure includes a configuration in which a known technique is added to the configuration described in the embodiment.

What is claimed is:

1. An ink set comprising:
a colored ink composition which contains a pigment and is a water-based ink jet ink; and
a water-based resin liquid composition which contains a resin,
wherein the resin liquid composition contains a urethane resin having an alicyclic structure or an aromatic ring structure and an acid value of 50 to 100 mg KOH/g, the urethane resin being resin particles in the water-based resin liquid;
wherein the ink set is configured for recording on a low-absorbent recording medium or a non-absorbent recording medium;
wherein the colored ink composition is a white ink containing, as the pigment, a white pigment;
wherein the urethane resin uses polytetramethylene glycol as a constituent component; and
wherein the polytetramethylene glycol has a number average molecular weight of 500 to 3000.

2. The ink set according to claim 1, wherein the urethane resin uses, as a constituent component, one or more selected from dicyclohexylmethane diisocyanate, isophorone diisocyanate, 1,3-bis(isocyanate methyl)cyclohexane, m-bis(isocyanate propyl)benzene, and m-bis(isocyanate methyl)benzene.

3. The ink set according to claim 1, wherein the colored ink composition includes a white ink containing a white pigment and a non-white ink containing a non-white pigment.

4. The ink set according to claim 1, wherein the white pigment is formed of titanium dioxide.

5. The ink set according to claim 3, wherein a content of the white pigment in the white ink is 5% to 20% by mass.

6. The ink set according to claim 1, wherein the polytetramethylene glycol has a number average molecular weight of 1000 to 2500.

7. The ink set according to claim 1, wherein the colored ink composition contains a resin other than the urethane resin.

8. The ink set according to claim 7, wherein the colored ink composition contains an acrylic-based resin.

9. The ink set according to claim 1, wherein a content of the urethane resin in the resin liquid composition is 1% to 15% by mass.

10. The ink set according to claim 1, wherein the resin liquid composition does not contain more than 10% by mass of a nitrogen-containing solvent.

11. The ink set according to claim 1, wherein a recorded material recorded using the ink set is used with a sealant film treatment applied to a recording surface.

12. A recording method comprising:
a colored ink composition attaching step of attaching a colored ink composition to a recording medium by an ink jet method; and
a resin liquid composition attaching step of attaching a resin liquid composition to the recording medium,
the colored ink composition and the resin liquid composition are the colored ink composition and the resin liquid composition described in claim 1.

13. The recording method according to claim 12, wherein the colored ink composition and the resin liquid composition are attached to the recording medium one on another.

14. The recording method according to claim 12, wherein the resin liquid composition attaching step is performed before the colored ink composition attaching step.

15. The recording method according to claim 12, wherein in the colored ink composition attaching step, a non-white ink containing a non-white pigment and a white ink containing a white pigment are used as the colored ink composition, and the non-white ink and the white ink are attached one on another.

16. The recording method according to claim 15, wherein in the colored ink composition attaching step, the white ink is attached after the non-white ink is attached.

* * * * *